US006961354B2

(12) United States Patent
Watanabe et al.

(10) Patent No.: US 6,961,354 B2
(45) Date of Patent: *Nov. 1, 2005

(54) INFORMATION TRANSMISSION METHOD AND ENCODING/DECODING APPARATUS AND ENCODING-MULTIPLEXING/DECODING-DEMULTIPLEXING APPARATUS IN INFORMATION TRANSMISSION SYSTEM IN WHICH INFORMATION TRANSMISSION METHOD IS APPLIED

(75) Inventors: Toshiaki Watanabe, Yokohama (JP); Yoshihiro Kikuchi, Yokohama (JP); Takeshi Chujoh, Shibuya-ku (JP); Takeshi Nagai, Higashimurayama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 123 days.

This patent is subject to a terminal disclaimer.

(21) Appl. No.: 10/319,660

(22) Filed: Dec. 16, 2002

(65) Prior Publication Data

US 2003/0072309 A1 Apr. 17, 2003

Related U.S. Application Data

(62) Division of application No. 09/920,936, filed on Aug. 3, 2001, which is a division of application No. 09/068,017, filed as application No. PCT/JP97/03054 on Sep. 2, 1997, now Pat. No. 6,310,897.

(30) Foreign Application Priority Data

| | | | |
|---|---|---|---|
| Sep. 2, 1996 | (JP) | | 8-232081 |
| Mar. 14, 1997 | (JP) | | 8-061306 |
| Jun. 25, 1997 | (JP) | | 9-168929 |
| Jul. 14, 1997 | (JP) | | 9-188750 |

(51) Int. Cl.[7] ............................................. H04J 3/12
(52) U.S. Cl. ......................................... 370/522; 370/535
(58) Field of Search ............................. 370/389, 522, 370/535, 252, 392, 465, 536, 538, 542, 543, 529, 349; 348/409.1

(56) References Cited

U.S. PATENT DOCUMENTS

| | | | |
|---|---|---|---|
| 5,162,923 A | 11/1992 | Yoshida et al. | |
| 5,168,356 A | 12/1992 | Acampora et al. | |

(Continued)

FOREIGN PATENT DOCUMENTS

| | | |
|---|---|---|
| CA | 2037527 | 9/1991 |
| CA | 2136616 | 1/1994 |

(Continued)

*Primary Examiner*—Chi Pham
*Assistant Examiner*—Alexander O. Boakye
(74) *Attorney, Agent, or Firm*—Oblon, Spivak, McClelland, Maier & Neustadt, P.C.

(57) ABSTRACT

In an information transmission method, error robustness is provided for the bit stream itself so that decoding processing can be properly performed even in the event of an error in important information such as header information. A bit stream reconstruction circuit (107) in an encoding apparatus adds sync signals to the heads of encoded data streams, which are encoded by an encoder (103), in certain bit stream units, and then inserts designation information in each bit stream by using a designation information insertion circuit (106). Each designation information indicates the addition of information for reconstructing important header information. By inserting the designation information in the bit stream obtained, reconstruction information can be added to the bit stream. Even if, therefore, an error is introduced into the header information, and the information cannot be used for decoding processing, the decoding processing can be properly continued by using the new reconstruction information designated by the designation information as a substitute.

10 Claims, 30 Drawing Sheets

U.S. PATENT DOCUMENTS

| | | |
|---|---|---|
| 5,289,276 A | 2/1994 | Siracusa et al. |
| 5,430,738 A | 7/1995 | Tsuda |
| 5,483,287 A | 1/1996 | Siracusa |
| 5,990,967 A | 11/1999 | Kawakami et al. |
| 6,310,897 B1 * | 10/2001 | Watanabe et al. .......... 370/522 |

FOREIGN PATENT DOCUMENTS

| | | |
|---|---|---|
| EP | 0 497 452 | 8/1992 |
| JP | 57-115043 | 7/1982 |
| JP | 01-213067 | 8/1989 |
| JP | 02-062176 | 3/1990 |
| JP | 02-206292 | 8/1990 |
| JP | 04-245833 | 2/1992 |
| JP | 04-239839 | 8/1992 |
| JP | 06-086251 | 3/1994 |
| JP | 06-205384 | 7/1994 |
| JP | 06-215492 | 8/1994 |
| JP | 07-143480 | 6/1995 |
| JP | 07-162801 | 6/1995 |
| JP | 07-508380 | 9/1995 |
| JP | 08-162979 | 6/1996 |
| WO | WO 94/00952 | 1/1994 |

* cited by examiner

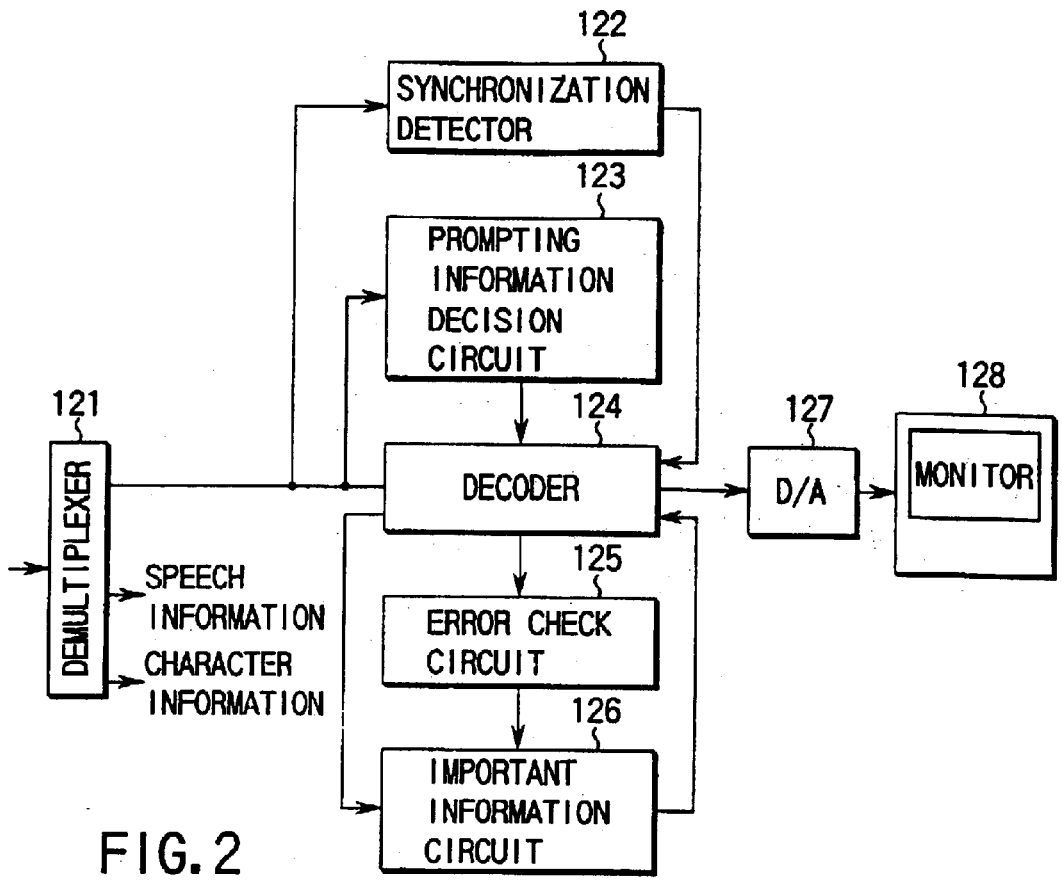
FIG. 2
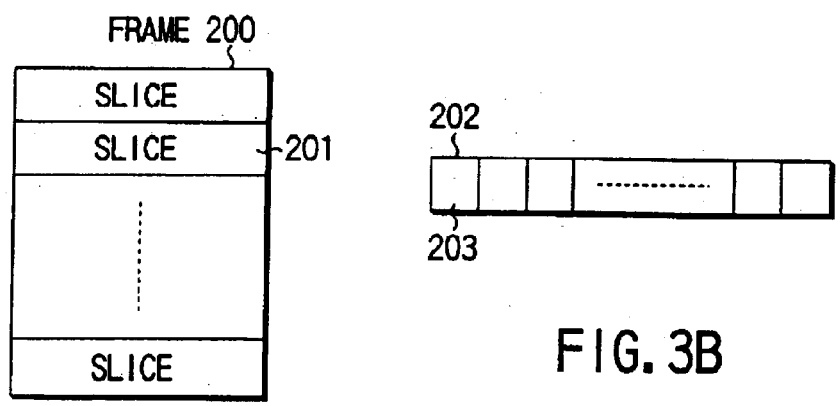
FIG. 3A
FIG. 3B

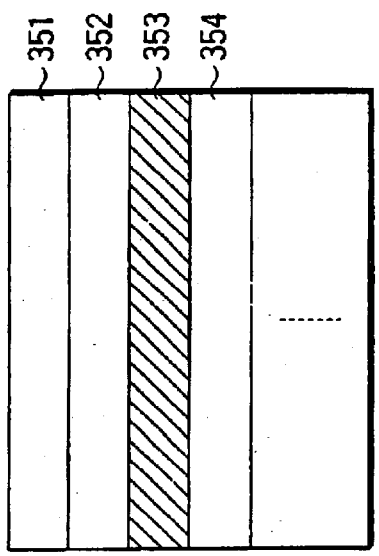

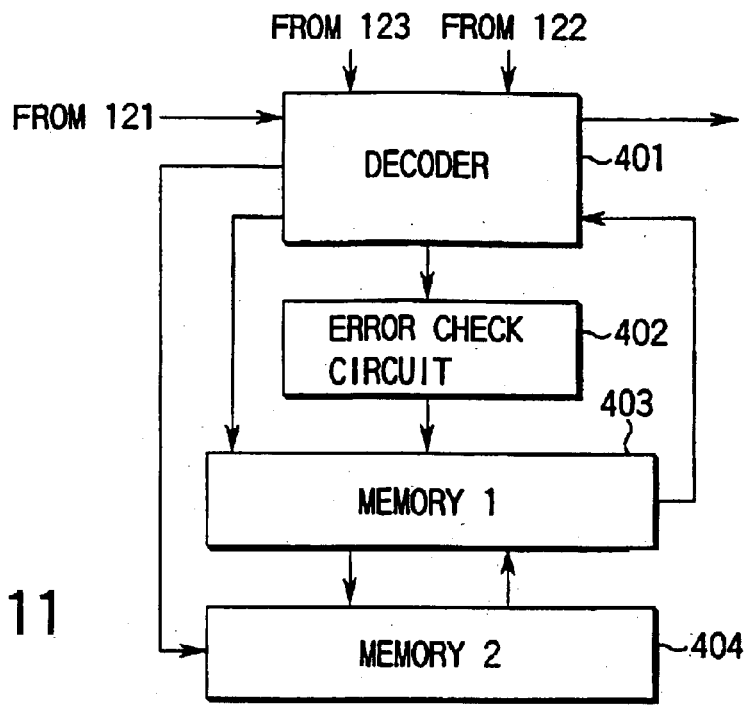
FIG. 11
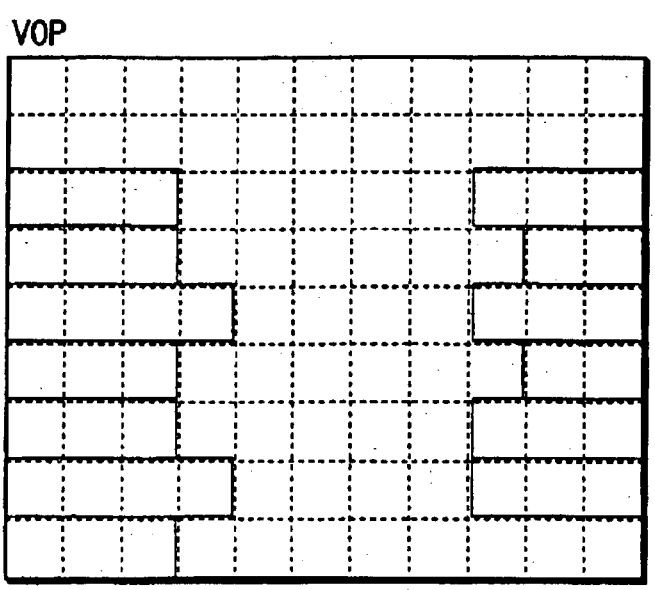
FIG. 12
FIG. 13

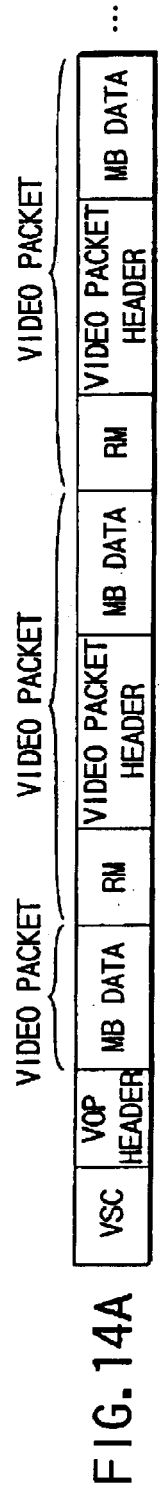
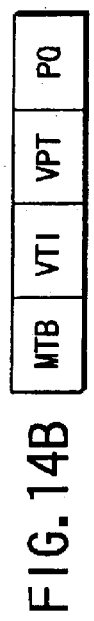
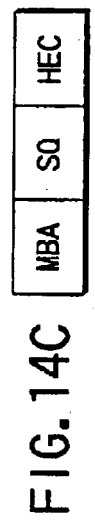
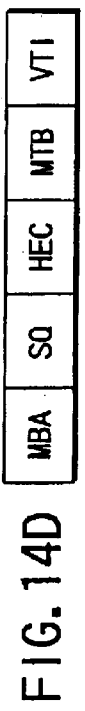
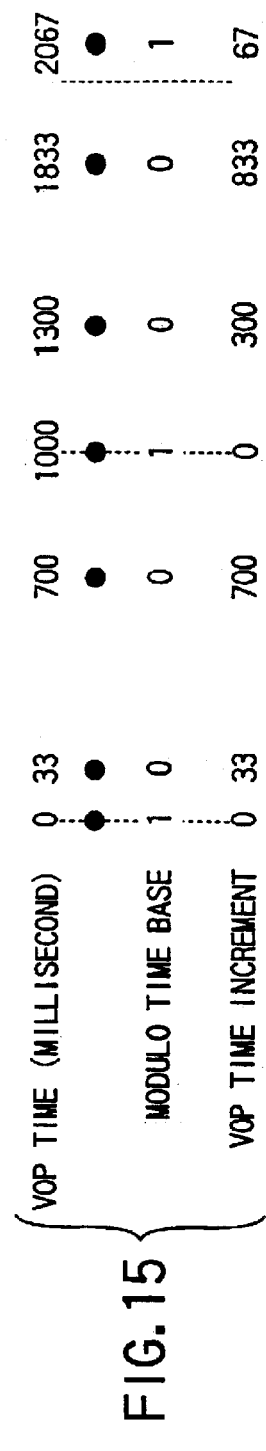
FIG. 14A
FIG. 14B
FIG. 14C
FIG. 14D
FIG. 15

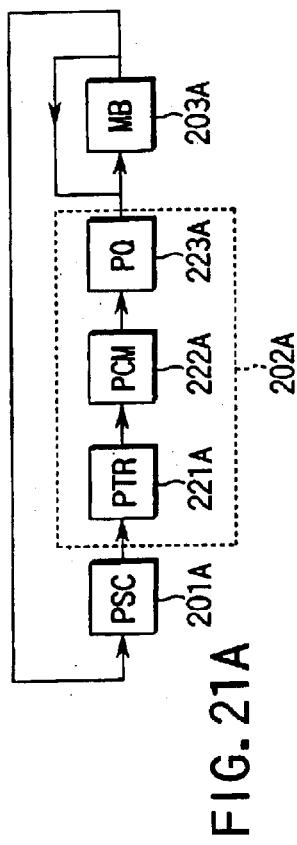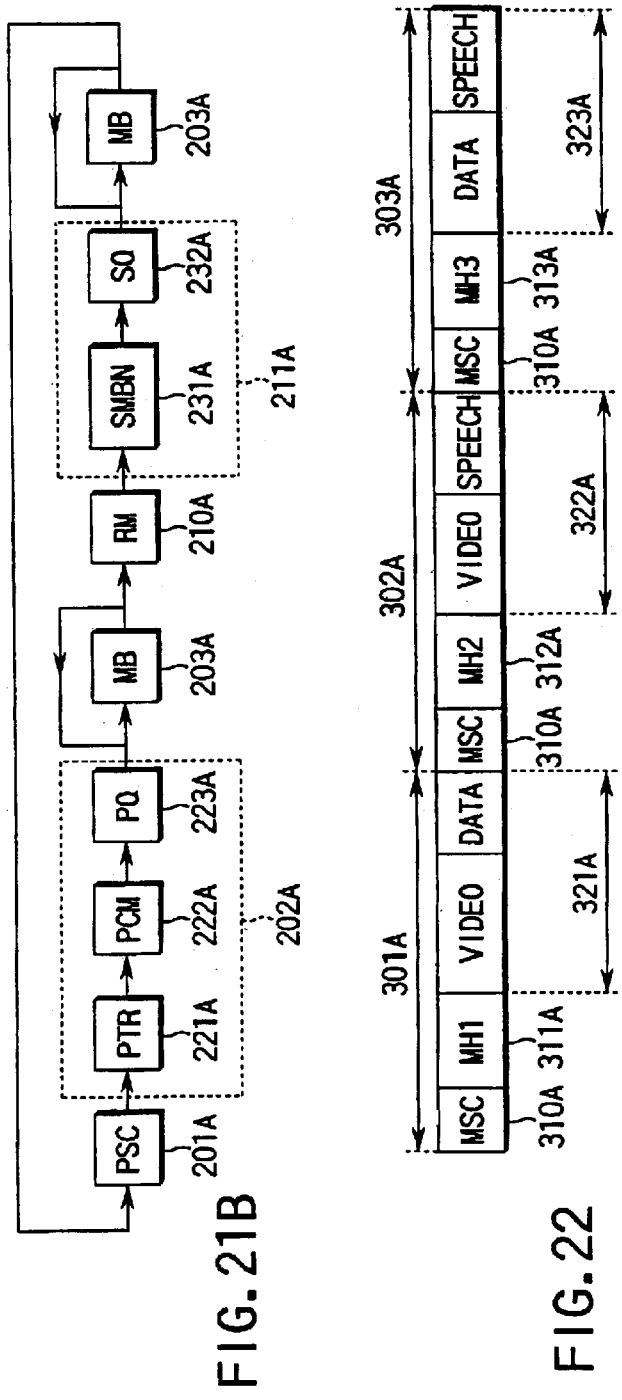

FIG. 31A
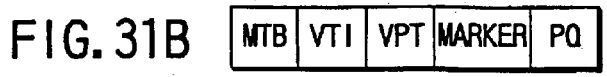
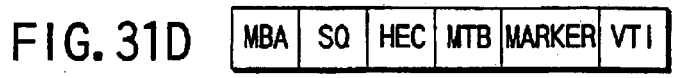
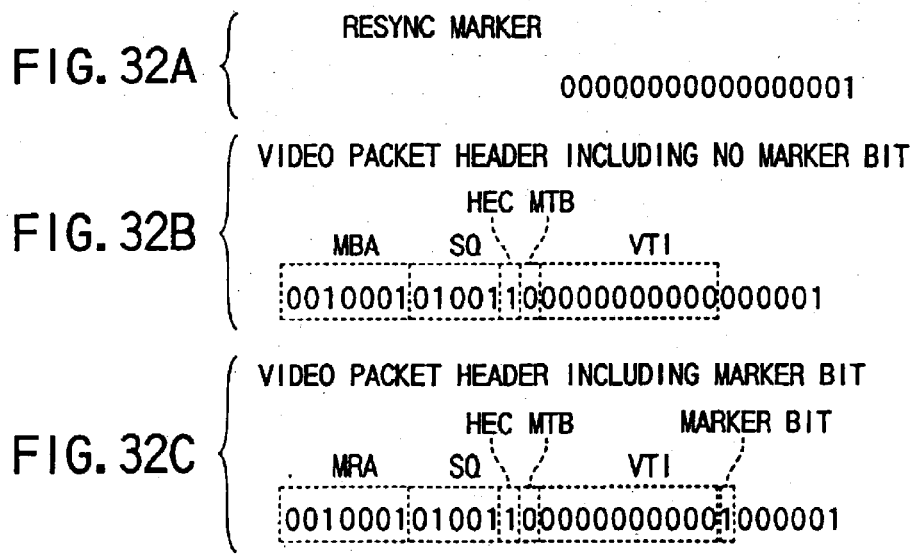
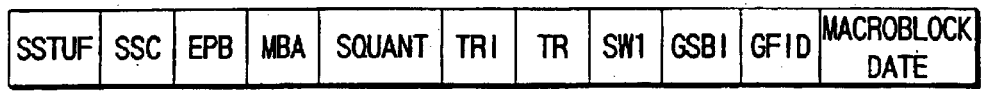
FIG. 33

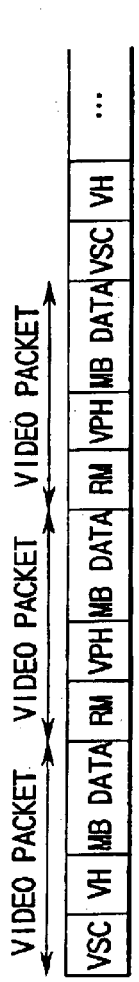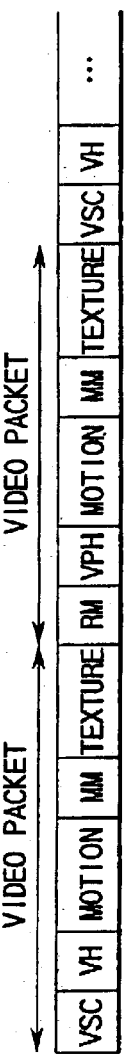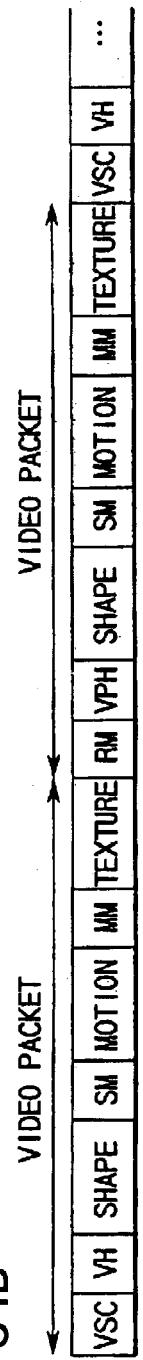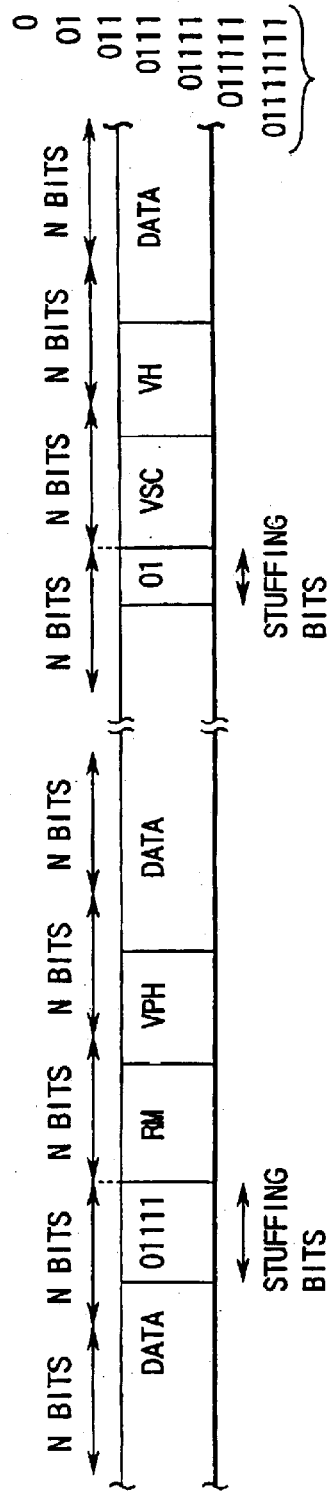

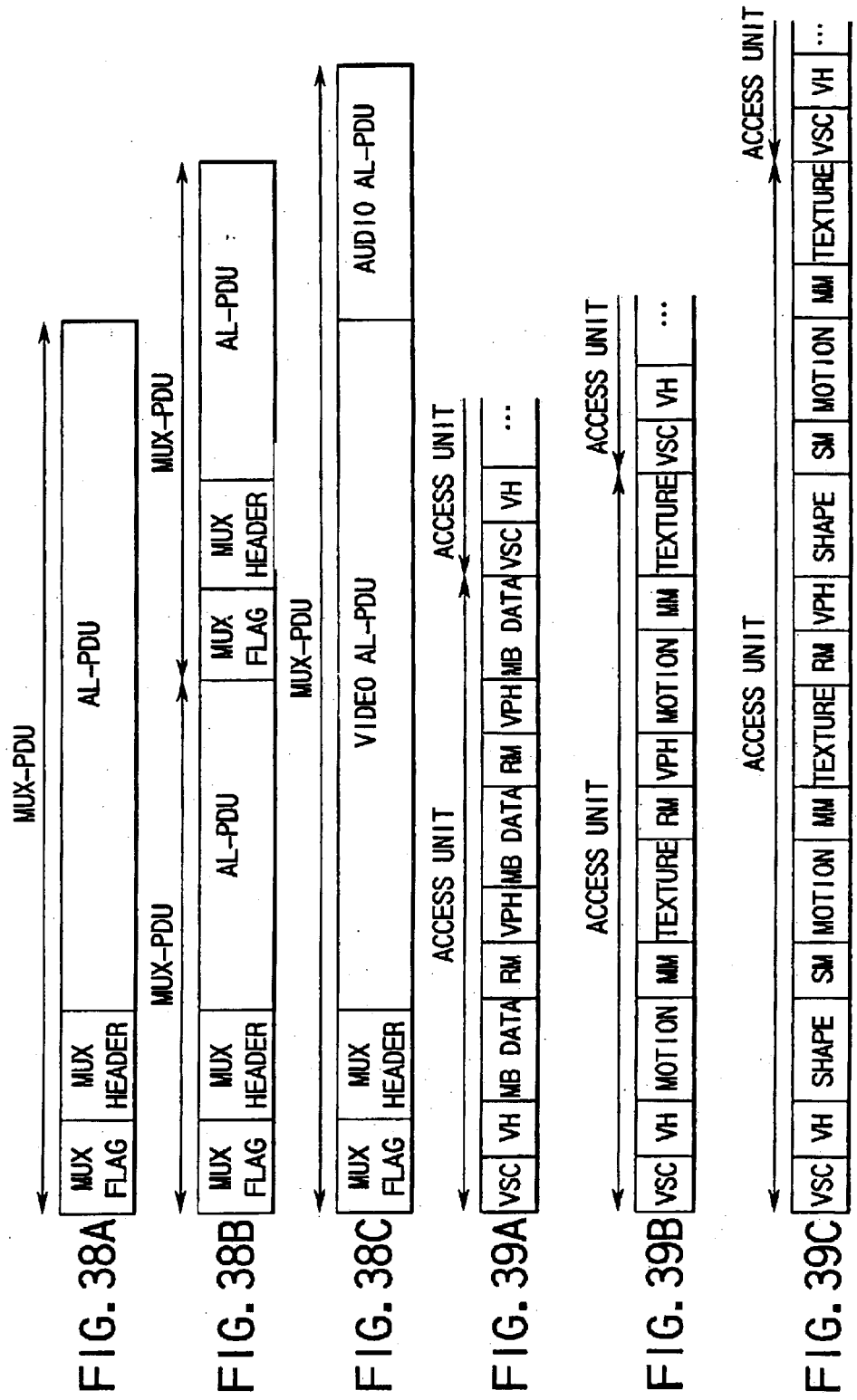

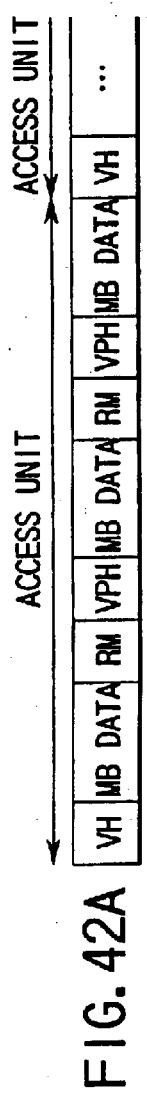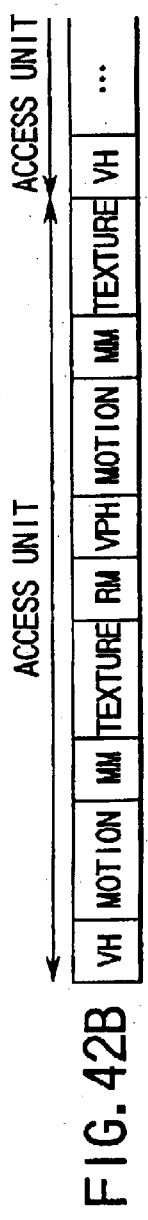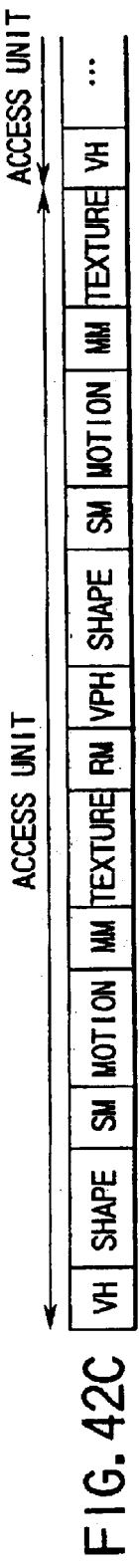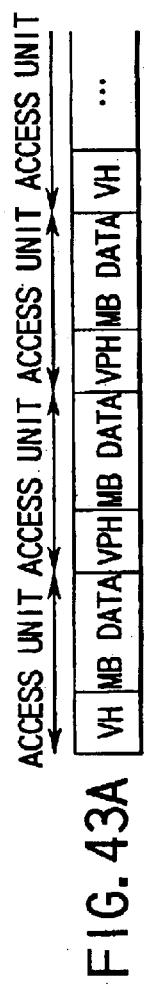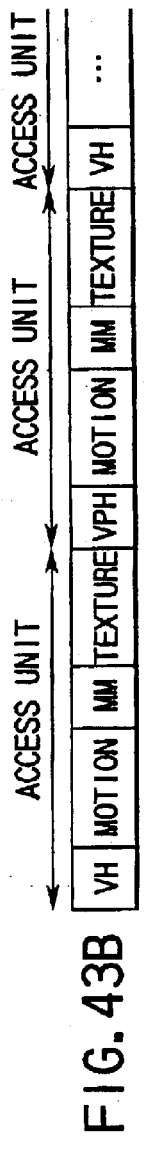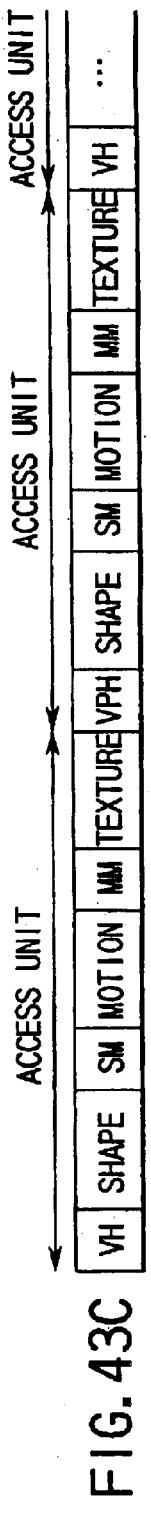

● ACCESS UNIT BOUNDARY
○ RE-SYNC MARKER

● ACCESS UNIT BOUNDARY
○ RE-SYNC MARKER
▨ HIGH QoS

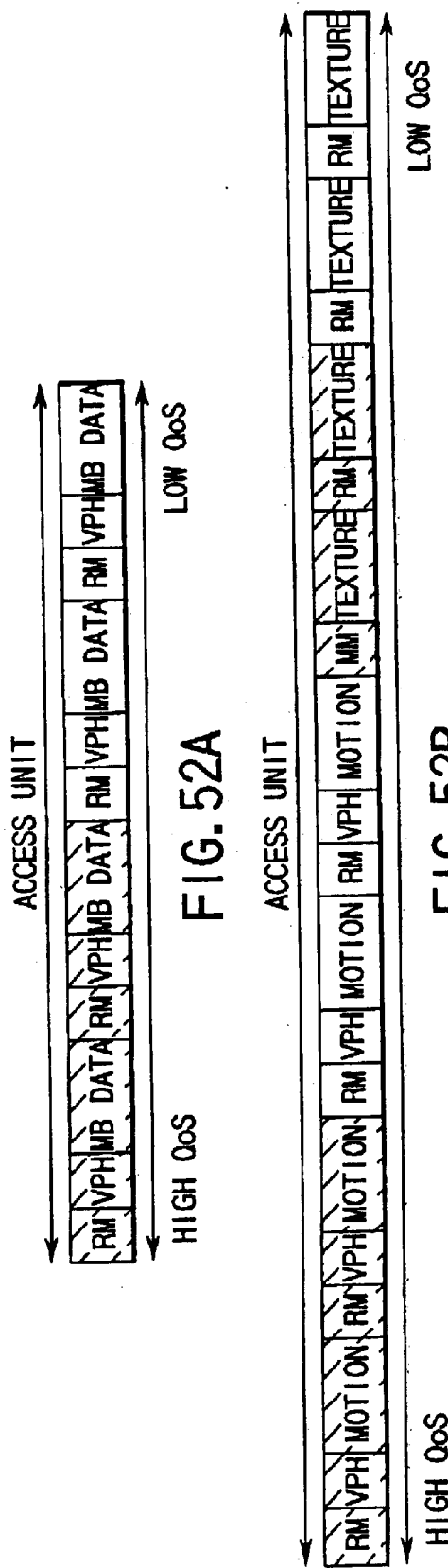
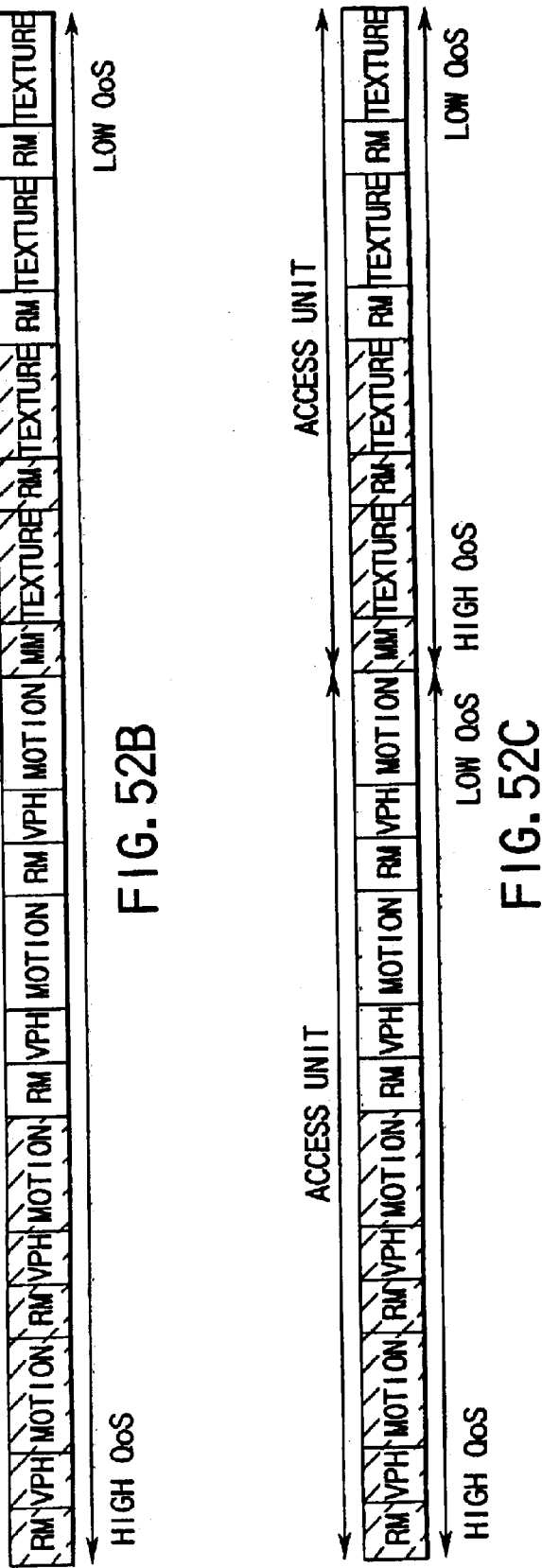
FIG. 52A
FIG. 52B
FIG. 52C

INFORMATION TRANSMISSION METHOD AND ENCODING/DECODING APPARATUS AND ENCODING-MULTIPLEXING/ DECODING-DEMULTIPLEXING APPARATUS IN INFORMATION TRANSMISSION SYSTEM IN WHICH INFORMATION TRANSMISSION METHOD IS APPLIED

CROSS REFERENCE TO RELATED APPLICATIONS

This Application is a divisional of and claims the benefit of the earlier filing date of co-pending U.S. patent application Ser. No. 09/920,936, filed Aug. 3, 2001, which is a divisional of U.S. patent application Ser. No. 09/068,017, filed May 1, 1998 (now U.S. Pat. No. 6,310,897), which is the National Stage of International Application No. PCT/JP97/03054, filed Sep. 2, 1997. The entire disclosure of the prior application is considered as part of the disclosure of the accompanying application and is hereby incorporated by reference herein.

FIELD OF THE INVENTION

The present invention relates to a data transmission method of transmitting an encoded video picture/still picture by using a wire communication network such as an ISDN or Internet or a radio communication network such as a PHS network or a satellite communication network and an encoding/decoding apparatus in a data transmission system to which the method is applied.

DISCUSSION OF THE BACKGROUND

With the recent advances in the techniques of performing digital encoding of various types of information such as picture information and the broadband network techniques, applications using these techniques have been increasingly developed, and systems for transmitting compress-encoded pictures and the like by using communication networks have been developed.

For example, a videophone, a teleconference system, and a digital television broadcast use a technique of compress-encoding video information and speech information to small information amounts, multiplexing the compressed video code stream, the compressed voice code stream, and other data code streams into one code stream, and transmitting/storing it.

As video signal compress-encoding techniques, motion compensation, discrete cosine transform (DCT), sub-band encoding, pyramid encoding, variable word-length encoding, and the like and schemes combining these techniques have been developed. The national standard schemes for video encoding include ISO MPEG1, MPEG2, ITU-T H.261, H.262, and H.263. The national standard schemes for multiplexing code streams obtained by compressing video signals and speech/audio signals and other data include the ISO MPEG system, ITU-TH.221 and H.223.

In a conventional video encoding scheme such as one of the above video encoding national standard schemes, a video signal is segmented into frames, and each frame is further segmented into small regions, thus encoding the signal in units of GOBs, macroblocks, or the like. Header information indicating the encoding mode and the like is added to each frame, GOB, and macroblock. These pieces of header information are always required to decode the overall GOBs and the like. If, therefore, a transmission path/storage medium error is introduced into header information to cause a decoding failure in a video decoder, the overall frame, GOB, or the like to which the header information is added cannot be properly decoded. As a result, the quality of the reconstructed picture in the video decoder greatly deteriorates.

When compress-encoded picture data is to be transmitted by using a communication network, the reception side must decode the data to reconstruct significant information from the transmitted bit stream of "0"s and "1"s. For this purpose, the above header information plays a very important role as information indicating a specific rule under which a predetermined block of bit streams is encoded. Such header information contains, for example, information indicating the prediction type of the currently encoded frame (intraframe encoding, interframe encoding, or the like), information indicating the display timing (time reference) of the frame, step size information required for quantization, and the like. If these pieces of header information are lost, information transmitted afterward cannot be properly decoded.

Assume that an error is introduced into a bit stream owing to some cause to change information indicating the prediction type of a frame from interframe encoding to intraframe encoding. In this case, even if actual information is properly transmitted afterward, since it is determined on the decoding side that the signal is obtained as a result of intraframe encoding, the signal is not properly decoded in the end. The quality of the reconstructed picture in the video decoder therefore greatly deteriorates.

Systems using wire communication networks have been prevalent to date. Even systems using radio communication systems have been built on the assumption that they use satellite communication with very low error rates. Sufficient consideration has not therefore been given to error robustness of the structure of a code stream to be transmitted, and satisfactory protection has not been given against transmission path errors in important information such as header information.

In a PHS system which is part of the mainstream of mobile communication, the error rate is about hundred thousand or one million times that in satellite communication. For this reason, sufficient correction cannot be performed by only error correction with respect to bit streams encoded by a conventional technique. In an Internet system which is expected to become part of the mainstream of communication like a PHS system, the types of errors that are likely to occur in data have not been statistically clarified, and hence proper error correction cannot be performed in some case. Furthermore, in the PHS and Internet systems, part of information in a code stream may be lost. Theoretically, error correction cannot cope with such a case. For this reason, the structure of a code stream itself needs to have error robustness.

As described above, satisfactory consideration has not been given to error robustness of the structure of a code stream to be transmitted. Satisfactory consideration about transmission path errors has not been given to important information such as header information, in particular, whose picture quality greatly deteriorates when a transmission path error is introduced therein.

SUMMARY OF THE INVENTION

It is an object of the present invention to provide an information transmission method capable of decoding a picture signal with high quality, even if a transmission path error is introduced into important information such as header information, by providing error robustness for the structure of a code stream itself, and an encoding/decoding apparatus in an information transmission system to which the method is applied.

According to the present invention, there is provided an information transmission method comprising causing a transmission side to transmit reconstruction information required to reconstruct contents of header information or part of the header information upon adding the reconstruction information to encoded information, causing a reception side to perform an error check with respect to the header information or part of the header information, and decoding the encoded information by using the reconstruction information as a substitute when an error is detected by the error check.

According to the present invention, there is provided an information transmission method of transmitting reconstructing information for reconstructing the contents of header information required to reconstruct encoded information or the contents of part of the information after adding the reconstruction information to a data stream, and decoding the data stream by using the reconstruction information as a substitute when an error is detected in the header information or part of the information on a reception side.

According to this information transmission method, even if an error is introduced into header information, and the header information cannot be used for decoding processing, the decoding processing can be properly continued by using information designated by designation information as a substitute. As reconstruction information, header information or part of the header information may be used, the difference information between previously transmitted header information or part thereof and important information to be currently transmitted, or the like may be used.

In addition, according to the present invention, in an information transmission system for segmenting information into two or more layers (e.g., a picture layer, a GOB layer, a macroblock layer, and a block layer), and transmitting a sync signal and header information required for decoding upon adding the sync signal and the header information to each layer, there are provided an encoding apparatus comprising means for inserting designation information having a predetermined pattern in the header information, and means capable of transmitting information which has already been transmitted from an upper layer or part of the information, information which has already been transmitted within the same layer or part of the information, or information capable of reconstructing the contents (the contents of a picture, e.g., a human figure or face) of information which has already been transmitted from the upper layer or within the same layer or the contents of part of the information, and a decoding apparatus corresponding to the encoding apparatus.

According to the present invention, in an information transmission system for transmitting a sync signal and header information required for decoding upon adding the sync signal and the information, there are provided an information transmission system encoding apparatus comprising an insertion section for inserting designation information having a predetermined pattern in the header information, and a transmission section capable of transmitting information which has already been transmitted or part of the information or information capable of reconstructing contents of the information or part of the information, and a decoding apparatus corresponding to the encoding apparatus.

According to the present invention, in an information transmission system for transmitting a sync signal and header information required for decoding upon adding the sync signal and the information, there are provided an encoding apparatus comprising an insertion section for inserting designation information having a predetermined pattern in the header information, and a transmission section capable of transmitting information for changing encoding processing of a portion associated with the header information from encoding processing of a portion before the portion associated with the header information, wherein error robustness is provided for a code stream itself to allow proper decoding processing even if an error occurs in the header information, and a decoding apparatus corresponding to the encoding apparatus.

In the above apparatus, as reconstruction information, transmission of which is indicated by designation information, information required for decoding processing on all the layers is preferably used. In addition, the reconstruction information, transmission of which is indicated by the designation information and information decoded in another section may be combined into information which is required for decoding processing on all the layers. Furthermore, as the bit pattern of designation information, a pattern, of the bit patterns defined as header information other than the designation information, which is not used can be used. Moreover, in transmitting picture information, information that can be transmitted owing to designation information is preferably information indicating the display timing of a frame, information indicating the prediction type of the frame, quantization step size information, or information indicating the time of the picture frame.

According to the present invention, in an encoding apparatus comprising one or more picture encoders for receiving and compress-encoding a picture signal, and a multiplexer for multiplexing a picture code stream output from each of the picture encoders and other data information code streams, and outputting a multiplexing code stream containing a multiplexed header and a multiplexed payload, there is provided an information transmission apparatus comprising an insertion section for inserting header information in the picture code stream or part thereof in the multiplexed header, and a transmission section for adding an error correction/detection code generated from information in the multiplexed header to the multiplexed header, providing error protection for the header information in the picture code stream together with other information associated with multiplexing in the multiplexed header by using an error correction/detection code, and transmitting the header information and other information.

In this encoding apparatus, strong error protection using error correction/detection codes is provided for header information, in a picture code stream, which causes a great deterioration in the quality of the decoded picture upon introduction of an error, together with a multiplexed header. Even if, therefore, a compressed picture is transmitted through a corrupted transmission path/storage medium, high reconstructed picture quality can be obtained.

The header information in the picture code stream which is contained in the multiplexed header may be information indicating the time of the picture frame. With this information, even if the information indicating the time of the picture frame, which is contained in the header information in the picture code stream, is lost, the time information of the picture frame can be decoded from the multiplexed header. Therefore, the decoded picture can be displayed/reconstructed at a proper time, and the correct boundaries between the picture frames in the picture code stream can be detected.

In addition, according to the present invention, there is provided an encoding/multiplexing apparatus comprising a segmentation section for segmenting a plurality of types of compressed code strings obtained by compress-encoding an input signal in encoding units, a first multiplexing section for generating multiplexed unit code strings by adding stuffing bits to the segmented compressed code strings in segmenting units, and a second multiplexing section for generating a multiplexing code stream by multiplexing the multiplexed unit code strings, the multiplexed unit code string having a length corresponding to an integer multiple of a predetermined length.

Since multiplexed unit code strings each having a length corresponding to an integer multiple of the predetermined length by adding stuffing bits in segmenting units are generated in this manner, the introduction of an error can be easily detected on the decoding/demultiplexing apparatus side by comparing the end position of a compressed code string in each multiplexed unit code string with the start position of stuffing bits. In addition, since a pseudo-sync code is not easily generated even if an error is introduced, high error robustness can be attained.

Furthermore, an encoding/multiplexing apparatus of the present invention includes a compress-encoder for generating compressed code strings by encoding an input signal so as to segment the signal into certain encoding units, and a multiplexing section for generating a multiplexing code stream by collecting sync words having the same degree of importance from the segmented compressed code strings. Codes indicating delimiters between the encoding units are inserted in the multiplexing code stream obtained in accordance with the respective degrees of importance. With this processing, error protection can be given in accordance with the degree of importance of each code word, and hence the quality of the decoded image improves in the event of a transmission path error.

BRIEF DESCRIPTION OF DRAWINGS

FIG. 2 is a block diagram showing the arrangement of a decoding apparatus used in the information transmission system according to the first embodiment;

FIGS. 3A and 3B are views showing how a frame is segmented into a plurality of layers in the information transmission system according to the first embodiment;

FIGS. 9A and 9B are views showing the internal state of a frame in a case in which a refresh operation is performed in the information transmission system according to the first embodiment and a corresponding bit stream;

FIGS. 10A and 10B are views showing other examples associated with the contents of important information to be transmitted by the information transmission system according to the first embodiment;

FIG. 11 is a block diagram showing the arrangement of a decoding processing circuit corresponding to FIGS. 10A and 10B;

FIG. 12 is a view showing a case in which designation information used in the first embodiment is part of another header information table;

FIG. 13 is a view for explaining the regions to be encoded in a frame which are used in an information transmission system according to the second embodiment of the present invention;

FIGS. 14A to 14D are views showing examples of the picture code streams used in the second embodiment;

FIG. 15 is a view for explaining time pieces of information contained in the picture code streams in FIGS. 14A to 14D;

FIGS. 21A and 21B are views showing an example of the video code stream used in the third embodiment;

FIG. 22 is a view showing an example of the multiplexing code stream used in the third embodiment;

FIGS. 31A to 31D are views showing a case in which bits are added to a code stream to prevent a pseudo-sync code in the present invention;

FIGS. 32A to 32C are views for explaining marker bits used for a code stream in the present invention;

FIG. 33 is a view showing an example of the bit stream using a slice layer in the present invention;

FIGS. 34A to 34C are views each showing an example of the video code stream used in the fourth embodiment of the present invention;

FIGS. 35A and 35B are views showing a method of setting sync codes and stuffing bits in the fourth embodiment;

FIGS. 38A to 38C are views each showing an example of the output from a multiplex layer in the fourth embodiment;

FIGS. 39A to 39C are views each showing the first example of how a video code stream is segmented on the adaptation layer in the fourth embodiment;

FIGS. 42A to 42C are views each showing the fourth example of how a video code stream is segmented on the adaptation layer in the fourth embodiment;

FIGS. 43A to 43C are views each showing the fifth example of how a video code stream is segmented on the adaptation layer in the fourth embodiment;

FIGS. 52A to 52C are views each showing another example of the format of an access unit in the fourth embodiment;

DETAILED DESCRIPTION OF THE INVENTION

Embodiments of the present invention will be described below with reference to the accompanying drawings.

Figure 1:
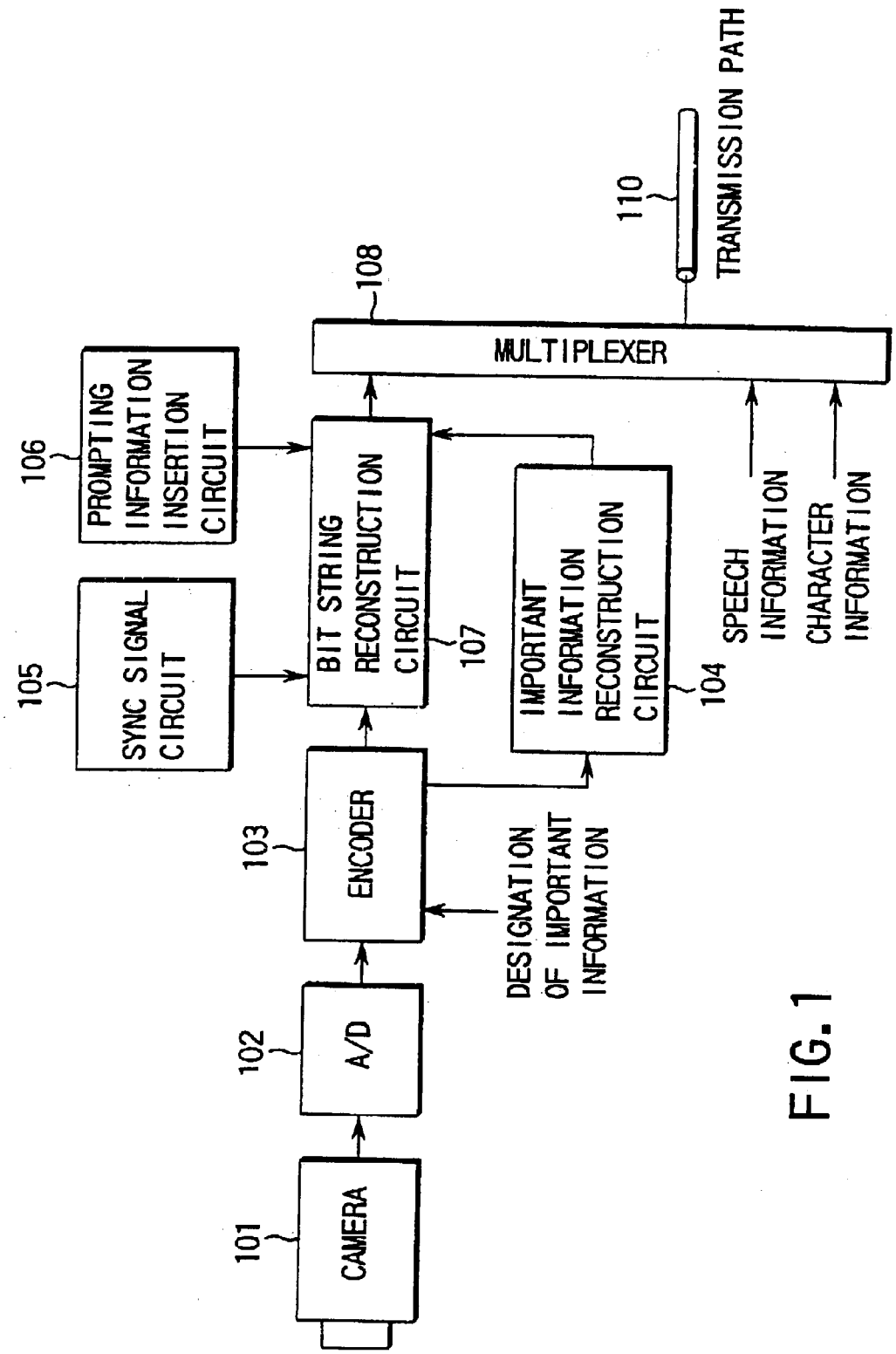
FIG. 1 is a block diagram showing the arrangement of an encoding apparatus used in an information transmission system according to the first embodiment of the present invention.

FIG. 1 shows the arrangement of an encoding apparatus according to an embodiment of the present invention. A video picture input by a camera 101 is converted into a digital signal by an A/D converter 102. The digital signal is input to an encoder 103. The encoder 103 performs high-efficiency compress-encoding of the video signal by DCT transformation, quantization, variable length encoding, dequantization, inverse DCT transformation, motion compensation, and the like, thereby generating an encoded data stream. In this encoding operation, important information required for decoding is inserted in the data stream. The important header information in the encoded data stream is input to an important header information reconstruction circuit 104 to be temporarily held therein. A bit string reconstruction circuit 107 follows the encoder 103. In the circuit 107, the final code stream to be transmitted to a transmission path, i.e., a data stream complying with MPEG2 or the like, is determined.

In the bit string reconstruction circuit 107, first of all, a sync signal determined by a sync signal circuit 105 is added to the head of the data stream in a predetermined bit stream unit. Thereafter, designation information is inserted in the bit stream by a designation information insertion circuit 106. The insertion of this designation information in the bit stream allows important header information to be added to the bit stream. Assume that important header information is inserted immediately after the designation information. The important header information is extracted from the important header information reconstruction circuit 104 to be added to the bit stream. The details of this bit stream configuration will be described later with reference to FIGS. 4A to 4C and 5A to 5E.

The bit stream finally determined by the bit string reconstruction circuit 107 is multiplexed with other pieces of encoded information such as speech information and character information by a multiplexer 108 and output to a transmission path 110. Note that an arbitrary part of the header information may be designated as important header information by the user from outside the encoder 103.

FIG. 2 shows the arrangement of a decoding section associated with the present invention.

The transmitted bit stream is demultiplexed into picture information, speech information, character information, and the like by a demultiplexer 121. The picture information bit stream is subjected to synchronization detection in a synchronization detector 122 to detect the decoding start position of the bit stream. This information is sent to a decoder 124, which starts or restarts decoding processing. Decoding is started from the header information on the uppermost layer. An error check circuit 125 checks whether errors have been introduced into these decoded signals. If introduction of an error is determined, since the corresponding portion cannot be used, the corresponding information is sent to an important information circuit 126. In decoding the header information on the next layer, after synchronization detection is performed by the synchronization detector 122, the same bit stream is transferred to a designation information determination circuit 123, in which the contents of the designation information are checked. With this operation, it is checked whether important header information has been added. If the information has been added, the type and adding position of the important header information are detected. An operation instruction is supplied from the designation information determination circuit 123 to the decoder 124 on the basis of the detection result. The decoder 124 decodes the header information on the current layer and the important header information added thereto. The result obtained by decoding the important header information is transferred to the important information circuit 126 to be temporarily held therein. If an error introduction confirmation signal is received from the error check circuit 125, it indicates that the important header information cannot be used on the upper layer. In this case, therefore, the decoder 124 substitutes the important header information sent on the current layer for the important header information on the upper layer to continue the decoding processing with respect to the subsequent code stream. The decoded information such as picture information is converted into an analog signal by a D/A circuit 127 to be displayed on a monitor 128.

The structure of a picture code stream used in this embodiment will be described next.

FIGS. 3A and 3B show the concept of a frame divided into a plurality of layers.

One frame 200 is broken up into a large number of slices (macroblock lines) 201 each constituted by 16 (pixel)×16 (pixel) macroblocks (FIG. 3A). Each slice 201 is a set of macroblocks 203 (FIG. 3B). The frame 200 as a whole corresponds to the uppermost layer. Each slice 201 corresponds to the next layer. Each macroblock 203 corresponds to the layer next to the next layer.

Figure 4A:
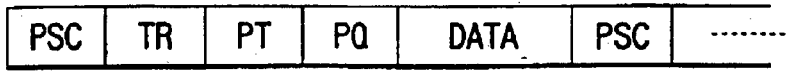
FIGS. 4A to 4C are views showing bit streams on the respective layers in FIGS. 3A and 3B.
Figure 4B:
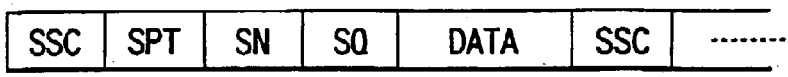
Figure 4C:
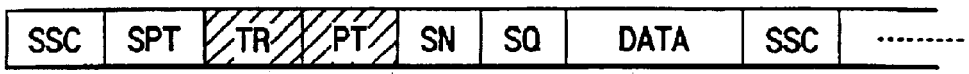

FIGS. 4A, 4B, and 4C show examples of the data structures on the respective layers in FIGS. 3A and 3B.

FIG. 4A shows a bit stream on the uppermost layer corresponding to FIG. 3A. FIG. 4B shows a conventional bit stream on the slice layer corresponding to the slice in FIG. 3B. FIG. 4C shows a newly proposed bit stream on the slice layer corresponding to the slice in FIG. 3B.

As shown in FIG. 4A, a picture code on the frame layer, i.e., a one-frame picture code, starts from a sync signal (picture start code; PSC) indicating the start position of a picture. A time reference (TR) indicating the timing at which the frame is reproduced, and type information (PT) indicating a predictive encoding type such as interframe encoding or intraframe encoding follow the PSC. Quantization step size information (PQ) follows the PT. These pieces of information TR, PT, and PQ are required for decoding processing or display of the entire frame. If these pieces of information are destroyed owing to the introduction of errors or the like, decoding or display cannot be properly performed even if synchronization is established on the subsequent layer. Lower layer information is stored in "Data" after "PQ". FIG. 4B shows a typical bit stream of "Data".

As shown in FIG. 4B, on the slice layer, a picture code stream of each slice 201 starts from a sync signal (SSC) indicating the start of the code, and prediction type information (SPT) and a slice number (SN) follow. Finally, quantization step size information (SQ) is set. "Data" after "SQ" is information on the macroblock layer lower than the slice layer.

The structure of the slice layer used in the first embodiment will be described next with reference to FIG. 4C.

As described above, the information in FIG. 4A is important information. If this information cannot be used, the frame cannot be properly decoded even if the information on the slice layer lower than the frame layer is not destroyed. To properly decode the information on the slice layer lower than the frame layer even if the information in FIG. 4A cannot be used, it is required to recognize that the contents of the header information in FIG. 4A correspond to the slice layer. In the first embodiment, therefore, a code having a predetermined bit pattern indicating designation information is prepared in "SPT". When this code appears, the header information in FIG. 4A, which has already been transmitted, is transmitted again on the slice layer. In this case, time ref "TR" and prediction coding time "PT") i.e., I, P and B frames, are transmitted (in this case, "SPT" is used as designation information, and "PT" is required because "SPT" does not indicate the prediction type). If no error is introduced into the frame layer in FIG. 4A, pieces of information (TR and PT) are not used. If the information on the frame layer is destroyed owing to an error or the like, decoding processing can be continued by using the pieces of information (TR and PT) in FIG. 4C as substitutes.

FIGS. 5A to 5E show other examples to be used in place of the examples in FIGS. 4A to 4C.

Figure 5A:
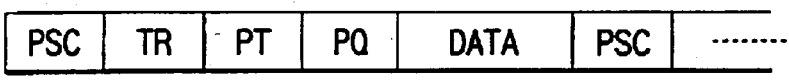
FIGS. 5A to 5E are views showing the formats of bit streams replacing those in FIGS. 4A to 4C.
Figure 5B:
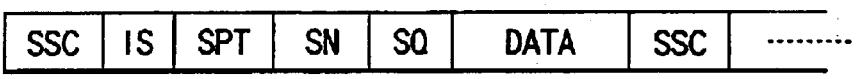
Figure 5C:
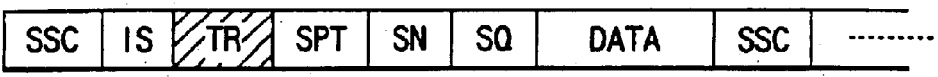

The frame layer in FIG. 5A is identical to that in FIG. 4A, but each of the slice layers in FIGS. 5B and 5C differs in designation information inserted in the header information from those in FIGS. 4B and 4C. In each of the slice layers shown in FIGS. 4B and 4C, the designation information is prepared in "SPT". In each of the slice layers in FIGS. 5B and 5C, a new bit (IS) is inserted. This bit IS is one bit that can be two types of identification information. "IS" may consist of two bits to represent four types of identification information.

When "SI" indicates that the important information on the frame layer follows, "TR" is transmitted after "IS" in FIG. 5C. On the decoding side, if the information on the frame layer is destroyed owing to an error or the like, "TR" on the slice layer is used. In this case, since "SPT" represents a prediction type alone, "PT" need not be transmitted again on the slice layer unlike the case shown in FIGS. 4A to 4C.

Figure 5D:
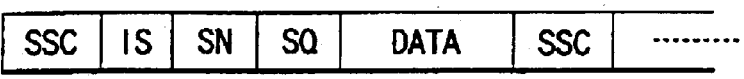
Figure 5E:
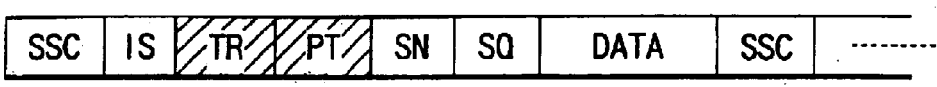

FIG. 5D shows a modification of the bit stream in FIG. 5B. In this case, no "SPT" is transmitted on the slice layer. In retransmitting the important information on the frame layer in accordance with the instruction of "IS", "TR" and "PT are required on the slice layer, as shown in FIG. 5E.

Figure 6A:
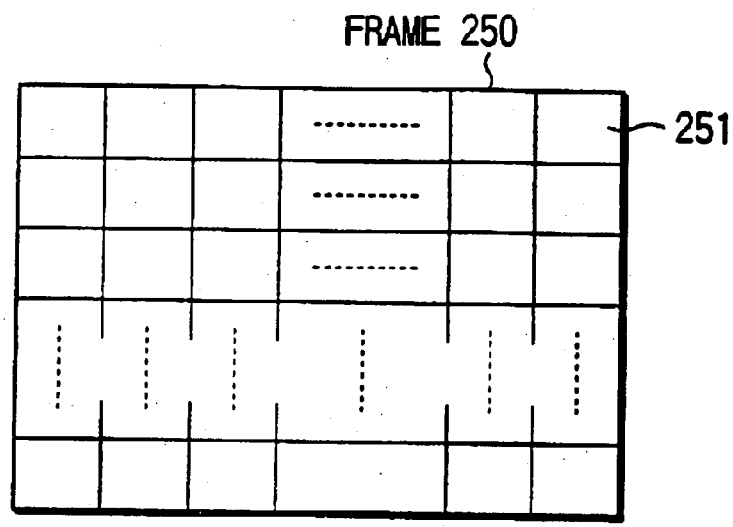
FIGS. 6A and 6B are views showing a case in which a frame has a single layer in the information transmission system according to the first embodiment.
Figure 6B:
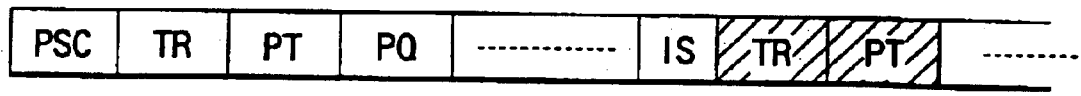

FIGS. 6A and 6B show the concept of a frame constituted by a single layer, and a bit stream.

In this case, as shown in FIG. 6A, the frame is simply divided into blocks (macroblocks). As shown in FIG. 6B, a one-frame picture code stream is synchronized by using only a sync signal PSC. In this case, since "TR" and "PT" are important as well, if the pieces of information are destroyed, the subsequent information cannot be decoded even if it is properly transmitted. A mechanism of retransmitting these important pieces of information by some method is effective in such a case. In the event of a random error, in particular, the probability that both the pieces of information TR and PT are destroyed can be greatly reduced as compared with a case in which the pieces of information are transmitted only once. In the event of a burst error as well, if the pieces of information TR and PT are retransmitted a certain period of time after they are transmitted for the first time, the probability that both the pieces of information are destroyed can be reduced. In the bit stream shown in FIG. 6B, "IS" is inserted after the important pieces of information TR, PT, PQ, and the like. With the instruction represented by this signal, "TR", "PT", and the like an be inserted after "IS". For the above reason, the designation information IS is preferably transmitted a time period equal to or longer than the statistical duration of a burst error after important information is transmitted.

Figure 7:
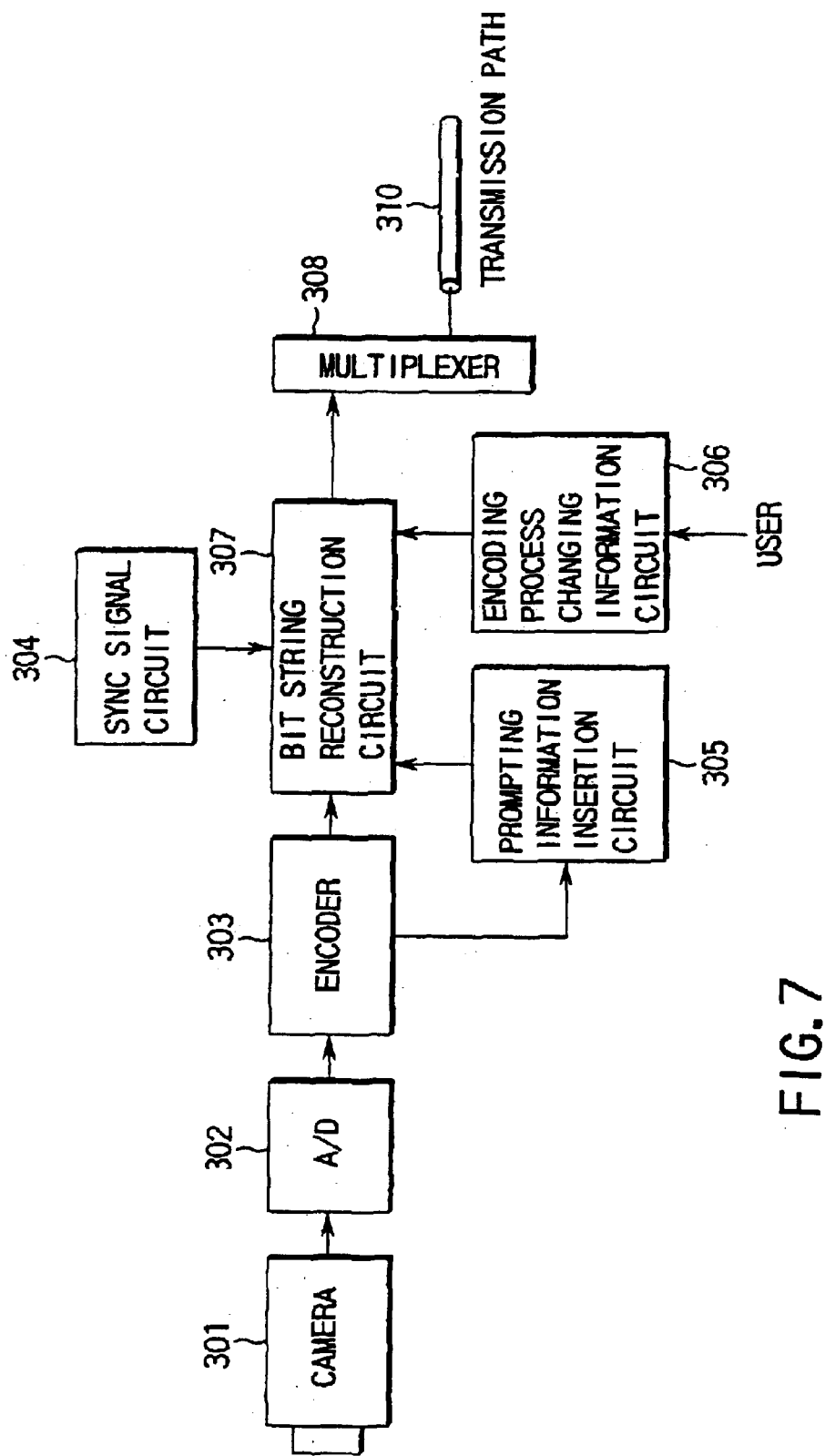
FIG. 7 is a block diagram showing another arrangement of the encoding apparatus used in the information transmission system according to the present invention.

FIG. 7 shows another example of the arrangement of the encoding section associated with the present invention.

The picture input by a camera 301 is converted into a digital signal by an A/D converter 302 and input to an encoder 303. A bit stream reconstruction circuit 307 follows the encoder 303. The bit stream reconstruction circuit 307 determines a final bit stream to be sent to a transmission path. When a network which is vulnerable to errors is to be used, a refresh operation without prediction is generally performed at predetermined intervals to minimize the possibility of propagation of an error which cannot be corrected. Such a refresh operation can be performed with respect to the overall frame (in this case, the prediction type of frame is intraframe encoding). However, since the amount of information generated in a refresh operation (intraframe encoding) is much larger than that in interframe encoding, it is difficult to use this technique for low-bit-rate encoding transmission. For this reason, it is preferable to use a technique of completing refresh for one frame in a period of time required for a plurality of frames by performing refresh for only part of each of a plurality of consecutive frames. In addition, when an error is detected on the decoding side, it is important to cause only the part in error to be retransmitted by outputting a retransmission request.

To realize these operations, the prediction type must be switched between intraframe encoding and interframe encoding in the process of encoding in the encoder 303. Assume that refresh is to be performed for only a predetermined part (the specific slice shown in FIGS. 3A and 3B in this case), since the prediction type of this slice differs from that of the preceding slice, this information is very important. In addition, since the quantization step size in a refresh operation greatly differs from that in interframe encoding, this information is important.

In the encoding apparatus shown in FIG. 7, when the encoder 303 performs-encoding for refresh, the information required for encoding is sent to a designation information insertion circuit 305. The important information required for the above refresh operation is stored in an encoding processing change information circuit 306 in advance. The bit stream reconstruction circuit 307 adds the sync signal determined by a sync signal circuit 304 to the head of the slice bit stream which has been encoded for refresh. Thereafter, designation information indicating that the data has been refreshed is inserted in the bit stream by the designation information insertion circuit 305. In this state, since the above important information required to decode the refreshed picture data can be added, the required important information is extracted from the encoding processing change information circuit 306 to be added to the slice bit stream. The details of this bit stream format will be described with reference to FIGS. 9A and 9B.

The bit stream finally determined by the bit stream reconstruction circuit 307 is multiplexed with other encoded pieces of information such as speech information and character information by a multiplexer 308. The resultant data is sent to a transmission path 310. Note that arbitrary information can be designated as important information to be added by the user from outside the encoding processing change information circuit 306.

Figure 8:
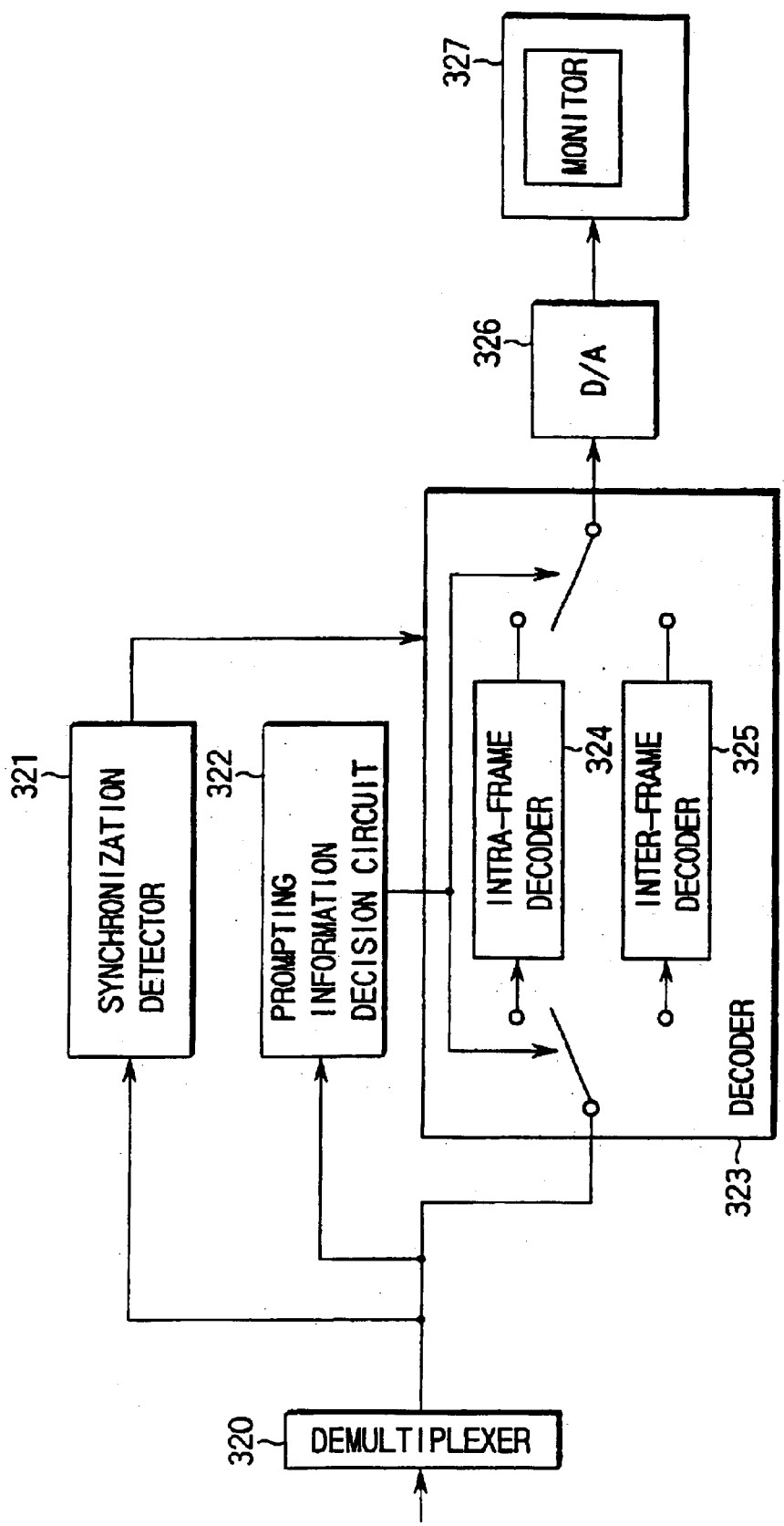
FIG. 8 is a block diagram showing the arrangement of a decoding apparatus corresponding to the encoding apparatus in FIG. 7.

FIG. 8 shows an example of the arrangement of a decoding apparatus corresponding to the encoding section in FIG. 7. A transmitted code stream is demultiplexed into picture information, speech information, character information, and the like by a demultiplexer 320. The picture information bit stream is subjected to synchronization detection in a synchronization detector 321 to detect the decoding start position of the bit stream. When this information is sent to a decoder 323, decoding processing is started or restarted. The bit stream is also transferred to a designation information determination circuit 322, in which the contents of the designation information are determined. When refresh can be performed, since it suffices if the type of decoding processing can be changed in accordance with the prediction type, i.e., intraframe encoding or interframe encoding, in response to this designation information, a switch for switching an intraframe decoder 324 and an interframe decoder 325 in an decoder 323 is switched in accordance with a signal from the designation information determination circuit 322. Decoding processing for a slice for refresh is executed by the intraframe decoder 324. This intraframe decoding processing is controlled in accordance with important information such as the above quantization step size. The picture information decoded by the intraframe decoder 324 or the interframe decoder 325 in the decoder 323 is converted into an analog signal by a D/A circuit 326 and displayed on a monitor 327.

FIGS. 9A and 9B show the format of a frame subjected to refresh, and the structure of a corresponding picture code stream.

A frame 351 is divided into a plurality of slices. Assume that a slice 353 for refresh is transmitted after a slice 352 to be subjected to interframe encoding (FIG. 9A). A next slice 354 is subjected to interframe encoding again. FIG. 9B shows the format of the bit stream to be transmitted in this case. Portions 361, 362, and 363 of this bit stream correspond to the slices 352, 353, and 354 in FIG. 9A. Designation information indicating refresh using intraframe encoding is inserted in "SPT2" contained in the slice bit stream for refresh. The subsequent information, "SQ2", indicates the quantization step size prepared for refresh. All "Data 2" is decoded as a result of intraframe encoding.

FIGS. 10A and 10B show other examples of the contents of the important information. FIG. 10A shows a beat stream on the frame layer. FIG. 10B shows a bit stream on the slice layer.

Referring to FIGS. 4A to 4C, on the slice layer, information following the designation information SPT is "TR". This information may express the display timing, but the number of bits associated with this expression may become large in some case. To prevent this inconvenience, in the case shown in FIGS. 10A and 10B, a technique of encoding the difference between given information and corresponding information which has been previously transmitted is employed. This technique is generally used for compress-encoding.

More specifically, if TR is 0 to 255, eight bits are required to express these values. Assume, however, that a condition that there is no low speed shot corresponding to three frames or more can be established. In this case, since adjacent frames are not separated from each other by three frames or more in a display operation, it suffices if the relative time reference can express four states (the number of low speed shots is 0, 1, 2, and 3). At this time, two bits are enough for "TR". The number of bits can therefore be reduced. In this case, however, since the immediately preceding information which has already been decoded is required, the display timing cannot be determined by only "TR" at this portion.

FIG. 10B shows an example of the bit stream to be transmitted on the slice layer with the above difference TR (DTR in FIG. 10B) being important header information. After "DTR" is decoded, the true TR of the current frame can be calculated by adding "DTR" to the information TR of the bit stream of the decoded preceding frame on the frame layer which corresponds to FIG. 10A.

FIG. 11 shows a circuit for performing decoding processing in the case shown in FIGS. 10A and 10B. This circuit in FIG. 11 operates upon replacing the decoding section in FIG. 2. First of all, the decoding start position of the bit stream sent from the demultiplexer 121 is detected by the synchronization detector 122, and "TR", "PT", and the like on the frame layer are decoded by a decoder 401. At the same time, the decoded information TR is stored in a memory (2) 404. An error check circuit 402 checks the presence/absence of errors in the header pieces of information. The result is transferred to a memory (1) 403 (the above processing is for the bit stream in FIG. 10A). With regards to the slice layer in FIG. 10B, first of all, the designation information determination circuit 123 determines "SPT". The decoder 401 then decodes "DTR" and "PT". "DTR" is transferred to the memory 403. If it is found from the information sent from the error check circuit 402 that the header information (TR) on the upper frame layer cannot be used owing to an error or the like, a request signal is output from the memory 403 to the memory 404 to transfer the information TR of the preceding frame, which has already been stored in the memory 404, to the memory 403. In the memory 403, this information TR and the above information DTR of the current frame are added together to form "TR" of the current frame. This information is returned to the decoder 401 to continue the decoding processing. The information TR is also transferred to the memory 404 to allow it to be used for the same processing in the next frame.

FIG. 12 shows a case in which a pattern, of bit patterns prepared for other header information, which is not used is used as designation information.

Assume that a 2-bit pattern is assigned as "SPT" in advance. In this case, there are three prediction types, namely I (intraframe encoding), P (forward predictive encoding, and B (bidirectionally predictive encoding), to which bit patterns of 00, 01, and 10 are respectively assigned. Since information corresponding to "11" is not used, this code is used as designation information. That is, if "SPT" is "11", it does not indicate any prediction type but indicates that important information follows. Note that the important information indicated by a designation information may be header information (TR, PT, PQ) or part thereof. Alternatively, this information may contain subsequent data (e.g., "Data" in FIG. 4A). These pieces of information can be changed in accordance with a request from the system, the frequency of occurrence of network errors, the required encoding rate, and the like.

As described above, according to the first embodiment, if important information such as header information is lost, information for reconstructing the important information is added/transmitted in accordance with an instruction of predetermined designation information. For this reason, even if an error or the like occurs in important header information, and the information cannot be reconstructed, decoding processing can be properly continued by using designation information transferred afterward and reconstructing information designated by the designation information.

The second embodiment of the present invention will be described next.

The overall arrangement of an encoding apparatus according to the second embodiment is almost the same as that of the encoding apparatus in FIG. 1. In the second embodiment, each frame (also a picture or VOP) is encoded so as to be broken up into small regions (the regions enclosed with the dotted lines in FIG. 13) referred to as macroblocks. In addition, to allow each code stream in a frame to restore synchronization when an error is introduced into a picture code stream obtained by encoding a picture signal, the frame is encoded in units of video packets (the regions enclosed with the solid lines in FIG. 13) each constituted by one or a plurality of macroblocks.

FIGS. 14A to 14D show an example of the picture code stream output from the encoding apparatus. FIG. 14A shows the overall picture code stream of one frame (VOP). A VOP start code ("VSC" in FIG. 14A) as a sync code which can be uniquely decoded, and a VOP header ("VOP header" in FIG. 14A) containing header information about the VOP are added to the head of the VOP.

The VOP code stream is further segmented into video packet code streams containing macroblocks ("MB data" in FIG. 14A). A sync code referred to as a resync marker ("RM" in FIG. 14A) which can be uniquely decoded, and a video packet header ("Video packet header" in FIG. 14A) following the resync marker are added to the head of the picture code stream of each video packet. Note, however, that since the VOP start code and the VOP header are added to the first video packet of the VOP, neither resync marker (RM) nor video packet header (Video packet header) are added to the first video packet.

FIG. 14B shows an example of the header information contained in the VOP header. Referring to FIG. 14B, the modulo time base (MTB) and the VOP time increment (VTI) are time pieces of information of the VOP. These pieces of information are used to define the decoding and display timings of the VOP frame.

The relationship between the time of a VOP, the modulo time base (MTB), and the VOP time increment (VTI) will be described below with reference to FIG. 15. The VOP time increment is information indicating the time of the VOP with a precision of milliseconds, and takes the value of the remainder obtained by dividing the time of the VOP by 1,000 milliseconds (1 sec). The modulo time base is information indicating the time of the VOP with a precision of seconds, and takes "0" if the time of the VOP is within the same second as the immediately preceding encoded VOP. If these VOPs fall within different second durations, the modulo time base takes the difference.

If, for example, the times (millisecond) of VOPs take 0, 33, 700, 1,000, 1,300, 1,833, and 2,067, the VOP time increments respectively take the remainders obtained by dividing these values, i.e., 0, 33, 700, 0, 300, 833, and 67 by 1,000. The module time base takes 1 when the value obtained by dividing the time by 1,000 and dropping all digits after the decimal point (0, 0, 0, 1, 1, 1, or 2 in FIG. 15) differs from that of the immediately preceding VOP. That is, the modulo time bases of the VOPs corresponding to time= 1, 1000, 2067 take "1", and those of the remaining VOPs take "0". In addition, the modulo time bases may be encoded using variable-length codes. For example, when the modulo time bases are 0, 1, 2, . . . , variable-length codes "1", "01", "001", . . . can be set in correspondence with the modulo time bases.

The VOP prediction mode (VPT) in FIG. 14B is information indicating the predictive encoding mode (I, B, or P) of the overall VOP. The VOP quantization parameter ("PQ" in FIG. 14B) is information indicating the quantization step width used to encode the VOP. When, however, a VOP is to be encoded upon being divided into a plurality of video packets, since the quantization step width must be changed in units of video packets, this information may be used as information indicating the quantization step width of the first video packet.

FIGS. 14C and 14D show examples of the information contained in a video packet header as header information to be added to a video packet. The macroblock number ("MBA" in FIGS. 14C and 14D) is information indicating the number of the first macroblock of the video packet. The video packet quantization parameter ("SQ" in FIGS. 14C and 14D) is information indicating the quantization step width of the video packet. The header expansion code ("HEC" in FIGS. 14C and 14D, which correspond to "IS" in FIGS. 5B to 5E) is a flag indicating whether important information to be duplexed (multiplexed) with the video packet header is added. When "HEC" is "0", no important information is added, as shown in FIG. 14C. When "HEC" is "1", important information is added, as shown in FIG. 14D. In the case shown in FIG. 14D, to be able to reconstruct the time information of the picture frame, the modulo time base ("MTB" in FIG. 14D) and the VOP time increment ("VTI" in FIG. 14D), which indicate the time of the VOP, are added as important information without any modification.

Figure 16:
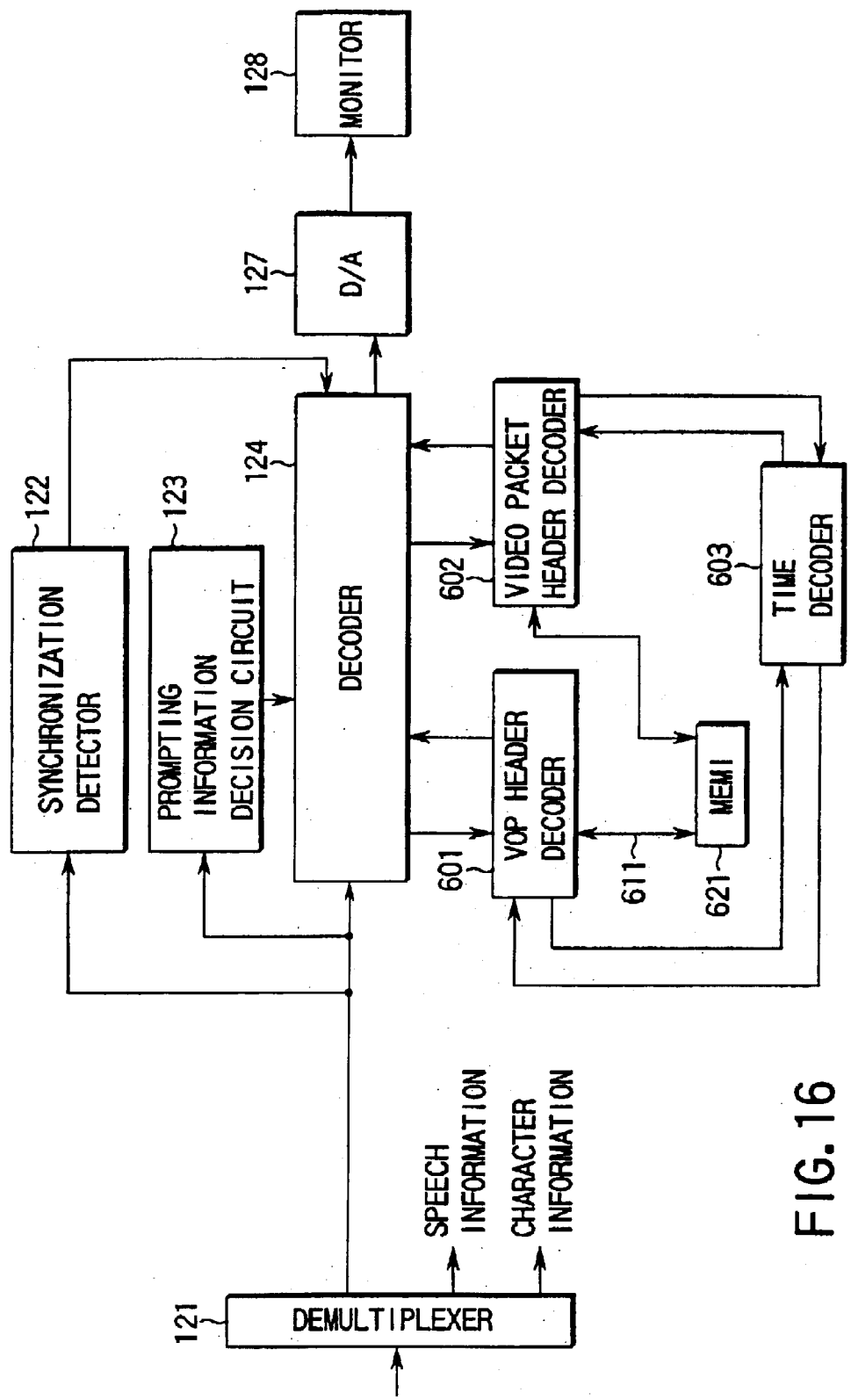
FIG. 16 is a block diagram showing the arrangement of a decoding apparatus used in the second embodiment.

FIG. 16 is a block diagram showing the arrangement of the decoding apparatus for the image code stream shown in FIGS. 14A to 14D. The same reference numerals in FIG. 16 denote the same parts of the decoding apparatus as in FIG. 2, and only the differences between the apparatuses will be described below. In addition to the arrangement of the decoding apparatus in FIG. 2, the decoding apparatus in FIG. 16 includes a VOP header decoder 601, a video packet header decoder 602, a time decoder 603, and a buffer memory 621.

Upon detection of a VOP start code, a synchronization detector 122 notifies a decoder 124 of a signal indicating that the code is detected. In response to this notification, the decoder 124 sends a code stream containing a VOP header following the VOP start code, i.e., the first video packet, to the VOP header decoder 601, which decodes the VOP header. The VOP header decoder 601 decodes the time information, VOP encoding mode information, and the VOP quantization parameter contained in the VOP header. Of these pieces of information, the time information, i.e., the modulo time base and the VOP time increment, are sent to the time decoder 603, which decodes the time information.

The time decoder 603 decodes the sent modulo time base and VOP time increment, and checks the presence/absence of an error. The time decoder 603 checks the presence/absence of an error by checking whether the time decoded from the modulo time base and the VOP time increment can be an actual time. When, for example, the encoded picture signal is an NTSC signal, since the frame rate is 30 Hz, the time should take a multiple of 1/30 sec (=33 msec). If, therefore, the decoded time is not a multiple of 1/30 sec, a transmission path error has occurred in the modulo time base and the VOP time increment. When the encoded picture signal is a PAL signal, it is checked whether the time is a multiple of 1/25 sec.

As a reference value for this error check, a predetermined value may be set in the encoding/decoding apparatus in accordance with the type of picture signal (PAL, NTSC, CIF, or the like), or information indicating a reference value may be inserted in a system information code stream (not shown) or part of a picture code stream.

When time information decoding and error checking in the time decoder 603 are complete, a signal indicating the presence of an error is sent to the VOP header decoder 601 if it is determined that the error is present. If it is determined that no error is present, a signal indicating the decoded time information is sent to the VOP header decoder 601. When there is no error in the time information, the VOP header decoder 601 stores this time information in the buffer memory 621, and sends a combination of the information and other pieces of information to the decoder 124. If there is an error in the time information, the first video packet code containing the VOP header is discarded, and decoding of the next video packet is started.

Upon detection of a resync marker (RM), the synchronization detector 122 sends a signal indicating the detection of the marker to the decoder 124. In response to the signal, the decoder 124 sends a code stream containing a video packet header following the resync marker, i.e., the second or subsequent video packet, to the VOP header decoder 601, which decodes the video packet header. The video packet header decoder 602 decodes the macroblock number (MBA), the video packet quantization parameter (SQ), and the header expansion code (HEC) which are contained in the video packet header.

If the header expansion code (HEC)="1", the succeeding modulo time base and VOP time increment are sent to the time decoder 603, which decodes the time information. The time decoder 603 decodes the sent modulo time base and VOP time increment, and checks the presence/absence of an error, as in the case of decoding of the preceding VOP header. When time information decoding and error checking in the time decoder 603 are complete, a signal indicating the presence of an error is sent to the video packet header decoder 602 if it is determined that the error is present. If it is determined that no error is present, a signal indicating the decoded time information Is sent to the video packet header decoder 602. In the video packet header decoder 602, if there is an error in the time information, the code stream of the video packet containing the VOP header is discarded, and the next video packet is decoded.

If there is no error in the time information, the time information is compared with the time information stored in the first buffer memory 621, i.e., the time information obtained from the immediately preceding encoded video packet to determine the VOP contained in the current video packet. If they coincide with each other, it is determined that the video packet is contained in the same VOP in which the immediately preceding encoded video packet is contained, and sends a signal indicating the information of the video packet decoded by the decoder 124, thereby performing decoding. In contrast to this, if the decoded time information differs from the time information stored in the buffer memory 621, it is determined that the video packet to be decoded is contained in a VOP different from the VOP in which the immediately preceding encoded video packet is contained. In this case, the decoded time information is recorded on the buffer memory 621. In addition, a VOP division signal indicating that a VOP region is present between the immediately preceding video packet and this video packet, and the video packet is decoded into a new VOP, the decoded time information, and a signal indicating the information of the decoded video packet header are sent to the decoder 124. Upon reception of the VOP division signal, the decoder 124 determines that the immediately preceding encoded video packet is the last video packet of the VOP, and performs VOP decoding end processing. The decoder 124 also determines that the video packet to be decoded from now on is the first video packet of the next VOP, and keeps decoding the video packet.

With this processing, even if a VOP start code and a VOP header are lost owing to errors, the VOP boundary can be determined on the basis of the time information of the video packet header, and correct decoding time information can be obtained. The quality of the decoded picture therefore improves.

Figure 17A:
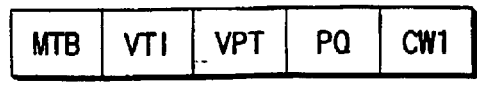
FIGS. 17A to 17C are views showing examples of the VOP header and the video packet header used in the second embodiment.
Figure 17B:
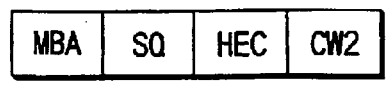
Figure 17C:
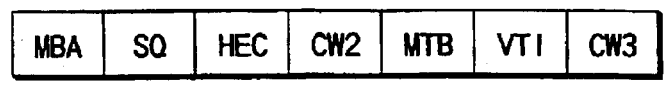

FIGS. 17A to 17C show the second examples of the VOP header and the video packet header. These examples differ from those shown in FIGS. 14A to 14D in that CRC check bits for checking the presence/absence of errors in the pieces of information contained in the headers are added.

FIG. 17A shows the VOP header. Referring to FIG. 17A, "CW1" is a check bit for performing a CRC check with respect to the modulo time base, the VOP time increment, the VOP encoding mode, and the VOP quantization parameter which are contained in the VOP header.

FIGS. 17B and 17C show the video packet headers. Referring to FIG. 17B, "CW2" is a check bit for performing a CRC check with respect to the macroblock number, the video packet quantization parameter, and the header expansion code. Referring to FIG. 17C, "CW3" is a check bit which is present in only a video packet with HEC="1", i.e., a video packet to which important information is added, and is used to perform a CRC check with respect to the important information, i.e., the modulo time base and the VOP time increment.

Figure 18:
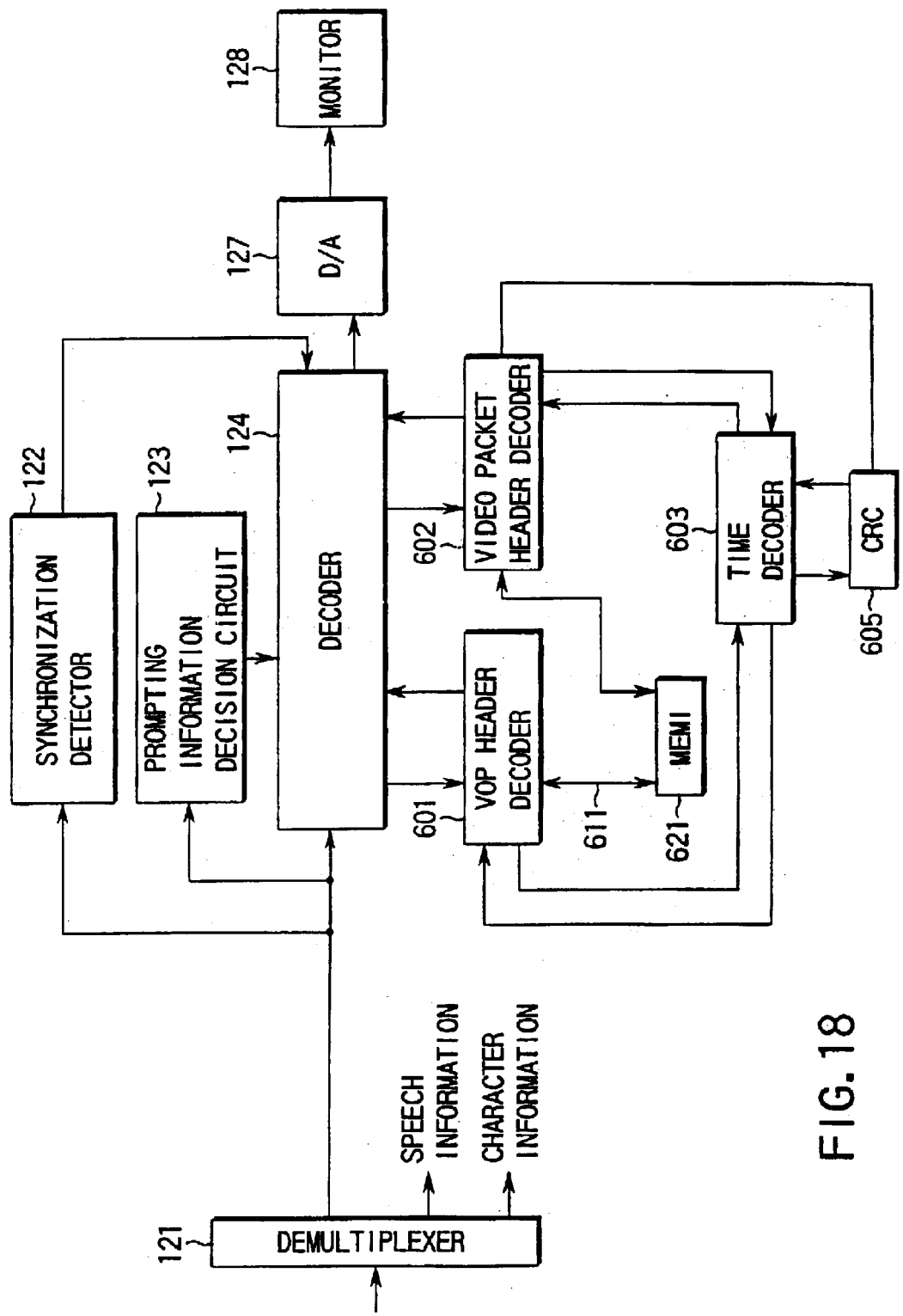
FIG. 18 is a block diagram showing another arrangement of the decoding apparatus used in the second embodiment.

FIG. 18 shows the arrangement of a decoding apparatus for the picture code stream shown in FIGS. 17A to 17C. The same reference numerals in FIG. 18 denote the same parts of the decoding apparatus as in FIG. 16. This apparatus differs from that shown in FIG. 16 in that a CRC determination circuit 605 is added. Only this difference will be described below.

The VOP header decoder 601 decodes the information contained in a VOP header, and performs a CRC check with respect to the VOP header by using the CRC check bit CW1. If the presence of an error is determined by the CRC check, the VOP header and the video packet contained therein are discarded, and decoding of the next video packet is started.

The video packet header decoder 602 decodes the information contained in a video packet header, and performs a CRC check with respect to the video packet header by using the CRC check bit CW2. If the presence of an error is determined by the CRC check, the video packet header and the video packet contained therein are discarded, and decoding of the next video packet is started. If it is determined that there is no error, and the decoded header expansion code HEC is "1", added important pieces of information (MTB and VTI) following "HEC" are decoded. The CRC check bit CW3 is used to check the presence/absence of an error in the important information. If it is determined that there is no error, comparison between these pieces of information and the time pieces of information in the VOP header and another video packet header, VOP segmentation processing, and the like are performed, as in the case of the decoding apparatus in FIG. 16.

As described above, in the second embodiment, since pieces of information indicating the time of a picture frame are added to each video packet in the frame, even if the time pieces of information contained in the VOP header are lost due to errors, the correct time information can be decoded on the basis of the important information in the video packet header. The decoding apparatus can therefore reconstruct and display the picture at the correct time.

In addition, since VOP boundary determination is performed by comparing the time information in a video packet header with the time information in the VOP header or another video packet header, even if the VOP start code is lost due to an error, the VOP boundary can be properly decoded. As a result, the quality of the decoded picture improves.

In the above case, the header expansion code (HEC) in each video packet indicates whether important information is contained. For example, HEC="1" may be set in all video packets to add important information, or HEC=1" may be set in only some video packets. By controlling the number of video packets in which important information is added in accordance with the presence/absence of a transmission path error, the important information can be efficiently protected with a small overhead.

Assume that the decoding time is expressed by a module time base (MTB) and VOP time increment (VTI) as in the above case. In this case, when MTB=0, even if the time information cannot be properly decoded, the decoding time error is one second or less. If, however, "MTB" is not properly decoded in a VOP with "MTB" other than "0", a large error in seconds occurs in the decoding time of a subsequent VOP. For this reason, in a VOP with MTB=0, HEC=0 may be set in all the video packets, or HEC=1 may be set in only a small number of video packets while HEC=1 is set in all or a large number of video packets in a VOP with "MTB" other than "1", thereby properly decoding "MTB".

In the second embodiment, as the important pieces of information to be duplexed with a video packet header, pieces of information indicating the time (modulo time base and VOP time increment) are used. In addition to these pieces of information, for example, a video packet header may be duplexed with information indicating an encoding mode, information indicating a quantization parameter, information associated with motion compensation, and motion vector information.

Assume that VOPs are to be encoded while a plurality of VOP prediction modes (e.g., intraframe predictive VOP (I-VOP), forward predictive VOP (P-VOP), and bidirectional predictive VOP (B-VOP)) are switched in units of VOPs. In this case, if this information about the VOP prediction mode cannot be properly decoded, the corresponding VOP cannot be decoded. When VOP prediction mode information is also contained as duplex information in a video packet header, even if the VOP prediction mode information of the VOP header is lost due to an error, the VOP can be decoded on the basis of the VOP prediction mode information contained in the duplex information in the video packet header. Such a case will be described below.

Figure 27A:
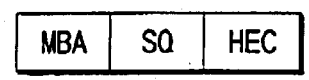
FIGS. 27A and 27B are views showing the third example of the video packet header used in the present invention.
Figure 27B:
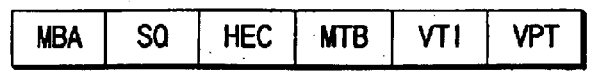

FIGS. 27A and 27B show the third examples of the video packet header in the second embodiment. The picture code stream and VOP header of an overall frame (VOP) are the same as those in FIGS. 14A and 14B. FIGS. 27A and 27B respectively show the video packet headers with header expansion HEC="0" and HEC="1". These video packet headers differ from those in FIGS. 14A to 14D in that when HEC="1", VOP prediction mode information ("VPT" in FIG. 27B) is contained in addition to pieces of information indicating the time ("MTB" and "VTI" in FIG. 27B).

The overall arrangement of a decoding apparatus for the picture code stream shown in FIGS. 27A and 27B is the same as that in FIG. 16. However, the operation of the video packet header decoder 602 is different from that in FIG. 16. In addition, this apparatus differs from that in FIG. 16 in that VOP prediction mode information (VPT) is recorded on the buffer memory 621 as well as time pieces of information (modulo time base and VOP time increment). The operation of the decoder, mainly the operation associated with these different points, will be described below.

Upon detection of a VOP start code, the synchronization detector 122 sends a signal indicating the detection of this code to the decoder 124. In response to this signal, the decoder 124 sends a code stream containing a VOP header following the VOP start code to the VOP header decoder 601 to decode the VOP header. The VOP header decoder 601 decodes the time pieces of information (MTB and VTI), the VOP encoding mode information (VPT), and the VOP quantization parameter (PQ) which are contained in the VOP header. Of these pieces of information, the modulo time base (MTB) and the VOP time increment (VTI) are sent to the time decoder 603, in which the time information is decoded.

The time decoder 603 decodes the sent modulo time base and VOP time increment, and checks the presence/absence of an error. The presence/absence of an error is checked by checking whether the time information decoded from the modulo time base and the VOP time increment can be an actual time. If, for example, the encoded picture signal is an NTSC signal, since the frame rate is 30 Hz, the time information should take a multiple of ⅟₃₀ sec (=33 msec). If, therefore, the decoded time information is not a multiple of ⅟₃₀ sec, it is determined that transmission path errors are present in the modulo time base and the VOP time increment. If the encoded picture signal is a PAL signal, an error check is performed by checking whether the time information takes a multiple of ⅟₂₅ sec.

As a reference value for this error check, a predetermined value may be set in the encoding/decoding apparatus in accordance with the type of picture signal (PAL, NTSC, CIF, or the like), or information indicating a reference value may be inserted in a system information code stream (not shown) or part of a picture code stream.

When time information decoding and error checking in the time decoder 603 are complete, a signal indicating the presence of an error is sent to the VOP header decoder 601 if it is determined that the error is present. If it is determined that no error is present, is a signal indicating the decoded time information is sent to the VOP header decoder 601. When there is no error in the time information, the VOP header decoder 601 further decodes the VOP prediction mode information (VPT). If there is no error in the VOP prediction mode information, either, the time information and the VOP prediction mode information are stored in the buffer memory 621, and are sent to the decoder 124, together with other pieces of information. If there is an error in the time information or the VOP prediction mode information contained in the VOP header, the code stream of the video packet containing the VOP header is discarded, and the next video packet is decoded.

Upon detection of a resync marker, the synchronization detector 122 sends a signal indicating the detection of the marker to the decoder 124. In response to this signal, the decoder 124 sends a code stream containing the video packet header following the resync marker to the VOP header decoder 601, which decodes the video packet header. The VOP header decoder 601 decodes the macroblock number, the video packet quantization parameter, and the header expansion code which are contained in the video packet header.

If header expansion code HEC="1", the modulo time base and the VOP time increment following "HEC" are sent to the time decoder 603, which decodes the time pieces of information. The time decoder 603 decodes the sent modulo time base and VOP time increment, and checks the presence/absence of an error, as in the case of decoding of the preceding VOP header. When time information decoding and error checking in the time decoder 603 are complete, a signal indicating the presence of an error is sent to the video packet header decoder 602 if it is determined that the error is present. If it is determined that no error is present, a signal indicating the decoded time information is sent to the video packet header decoder 602. If there is an error in the time information, the video packet header decoder 602 discards the code stream of the video packet containing the video packet header, and decodes the next video packet.

If there is no error in the time information, the VOP prediction mode information following the time information is decoded. If there is no error in the VOP prediction mode information, either, the decoded time information is compared with the time information stored in the buffer memory 621 to determine the VOP containing the video packet. If they coincide with each other, it is determined that the video packet is contained in the same VOP in which the immediately preceding encoded video packet is contained, and a signal indicating the information of the decoded video packet header is sent to the decoder 124, thereby decoding the video packet. In contrast to this, if the decoded time information differs from the time information stored in the buffer memory 621, it is determined that the video packet to be decoded from now on is contained in a VOP different from the immediately preceding decoded video packet. In this case, the decoded time information and VOP prediction mode information are recorded on the buffer memory 621, and a VOP segmentation signal indicating that this video packet is the first packet of the VOP, a signal indicating the decoded time information, and a signal indicating the information of the decoded video packet header are sent to the decoder 124. Upon reception of the VOP segmentation signal, the decoder 124 determines that the immediately preceding decoded video packet is the last packet of the VOP, and performs VOP decoding end processing. The decoder 124 also determines that the video packet to be decoded from now on is the first video packet of the next VOP, and performs VOP decoding start processing, thereby continuing to decode the video packet.

If the VOP prediction mode information contained in the video packet header differs from the VOP prediction mode information recorded on the buffer memory 621, the video packet may be decoded by using the VOP prediction mode information contained in the video packet header. With this operation, even if the VOP prediction mode information contained in the VOP header cannot be properly decoded, the video packet can be decoded.

With this processing, even if a VOP start code and a VOP header are lost due to errors, since the VOP boundary and the VOP prediction mode can be properly identified from the time information and the VOP prediction mode information of the video packet header, the quality of the decoded picture improves.

Assume that in decoding a VOP header or a video packet header, error check information (CRC, stuffing bits, or the like) is present in a picture code stream, or a circuit for receiving a code stream from a transmission path/storage medium or a demultiplexer for demultiplexing a received code stream into a picture code stream, a speech code stream, and the like has the function of determining the presence/absence of an error in a code stream. In this case, the presence/absence of an error in a decoded VOP header or video packet header may be determined by using the determination result obtained by using such error check information or such a circuit. If it is also determined by such a means that there are errors in these decoded pieces of information, these pieces of information are not used for picture decoding. Alternatively, a video packet containing information in which the presence of an error is determined may be discarded without being decoded.

Figure 28A:
FIGS. 28A and 28B are views showing the fourth example of the video packet header used in the present invention.
Figure 28B:
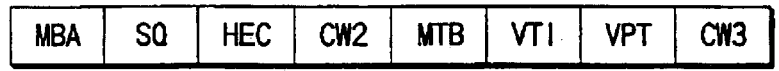

FIGS. 28A and 28B show the fourth example of the video packet header in the second embodiment. The picture code stream and VOP header of an overall frame (VOP) are the same as those in FIGS. 14A and 17A. FIGS. 28A and 28B respectively show the video packet headers with HEC="0" and HEC="1". These video packet headers differ from those in FIGS. 17B and 17C in that when HEC="1" a VOP prediction mode ("VPT" in FIG. 28B) is contained in addition to pieces of information indicating the time ("MTB" and "VTI" in FIG. 28B).

The overall arrangement of a decoding apparatus for the picture code stream in 28A and 28B is the same as that shown in FIG. 18. However, the operation of the video packet header decoder 602 is different from that in FIG. 18. In addition, this apparatus differs from that in FIG. 18 in that VOP prediction mode information (VPT) is recorded on the buffer memory 621 as well as time pieces of information (modulo time base and VOP time increment). The operation of the decoder, mainly the operation associated with these different points, will be described below.

The VOP header decoder 601 decodes the information contained in a VOP header, and performs a CRC check with respect to the VOP header by using the CRC check bit CW1. If the presence of an error is determined by the CRC check, the VOP header and the video packet in which the VOP header is contained are discarded, and decoding of the next video packet is started.

The video packet header decoder 602 decodes the information contained in the video packet, and performs CRC check with respect to the video packet header by using the CRC check bit CW2. If the presence of an error is determined by the CRC check, the video packet header and the video packet in which the video packet header is contained are discarded, and decoding of the next video packet is started. If it is determined that there is no error, and the decoded header expansion code HEC is 1, duplexed important pieces of information ("MTB", "VTI", and "VPT" in FIG. 28B) following "HEC" are decoded. The CRC check bit CW3 is used to check whether an error is present in the duplexed important information. If there is no error, comparison between these pieces of information and the time pieces of information in the VOP header and another video packet header, VOP segmentation processing, and the like are performed, as in the case of the decoding apparatus in FIG. 16.

As described above, since pieces of information indicating the time are contained in important information, even if the time information contained in a VOP is lost due to an error, correct time information can be decoded from the important information in the video packet header. The decoding apparatus can therefore reconstruct and display the picture at a correct time. In addition, since the time information in a video packet header is compared with the time information in a VOP header or another video packet header to perform VOP boundary determination, even if a VOP start code is lost due to an error, a VOP boundary can be properly decoded, and the quality of the decoded picture improves.

In addition, when VOP prediction mode information is also contained as duplexed information in a video packet header, even if the VOP prediction mode information in the VOP header is lost due to an error, the VOP can be decoded on the basis of the VOP prediction mode information contained as duplexed information in the video packet header.

In the second embodiment, to prevent patterns identical to sync codes (Picture start code, VOP start code, Resync marker, and the like) from being generated in a VOP header and a video packet header, bits called marker bits may be added.

FIGS. 31A to 31D show an example of how marker bits are added to the code streams in FIGS. 14A to 14D. Referring to FIGS. 31A to 31D, "marker" behind the VOP time increment (VTI) is a marker bit having a predetermined bit value (e.g., "1").

FIGS. 32A to 32C show a comparison between a video packet header without any marker bit and a video packet header with a marker bit. Assume that the resync marker as a sync code is a 17-bit code word having a bit pattern of "00000000000000001", the VOP time increment (VTI) is a code word having an arbitrary 10-bit value, and "MTB" is a variable-length code having "0" as the last bit.

If no marker bit is set, and "VTI" has a pattern of consecutive "0"s, a bit pattern identical to that of the resync marker is generated, as shown in FIG. 32B. In the case shown in FIG. 32B, "0" of "MTB", "0000000000" of "VTI", and the subsequent bit stream of "000001" constitute the same pattern as that of the resync marker.

In contrast to this, as shown in FIG. 32C, by adding the marker bit "1" behind "VTI", the number of consecutive "0"s in the video packet header is limited to a maximum of 11 bits (the last one bit "0" of "MTB" and "0000000000" of "VTI"). A bit pattern identical to that of the resync marker is not therefore generated.

Note that a marker bit has a predetermined bit value ("1" in the case shown in FIGS. 32A to 32C). For this reason, the decoding apparatus may determine the presence/absence of an error in a VOP header and a video packet header by checking whether a marker bit has this predetermined value.

Marker bits may be added to other code streams like those shown in FIGS. 17A to 17C, 27A, 27B, 28A, and 28B in the second embodiment.

Such a code stream structure may be applied to code streams using the slice layer. FIG. 33 shows another code stream using the slice structure in the first embodiment.

Referring to FIG. 33, reference symbol SSC denotes a slice sync code; EPB, a bit having a bit value of "1" which is added to the code stream to prevent a portion other than a sync code (e.g., "SSC") from having the same bit pattern as that of the sync code; MBA, information indicating the number of the first macroblock of the corresponding slice; SQUATNT, a quantization parameter used in the slice; and GFID, information indicating the information contained in a picture header or part of the information. When the sync codes SSCs are to be set at given byte positions in the code stream, stuffing bits SSTUF are set before "SSC". "Macroblock Data" is the information of each macroblock.

"TR" is duplexed important information, which is time information (Temporal Reference). "TRI" is a 1-bit flag indicating whether "TR" is added. When TRI=1, "TR" is added.

The third embodiment of the present invention will be described next.

Figure 19:
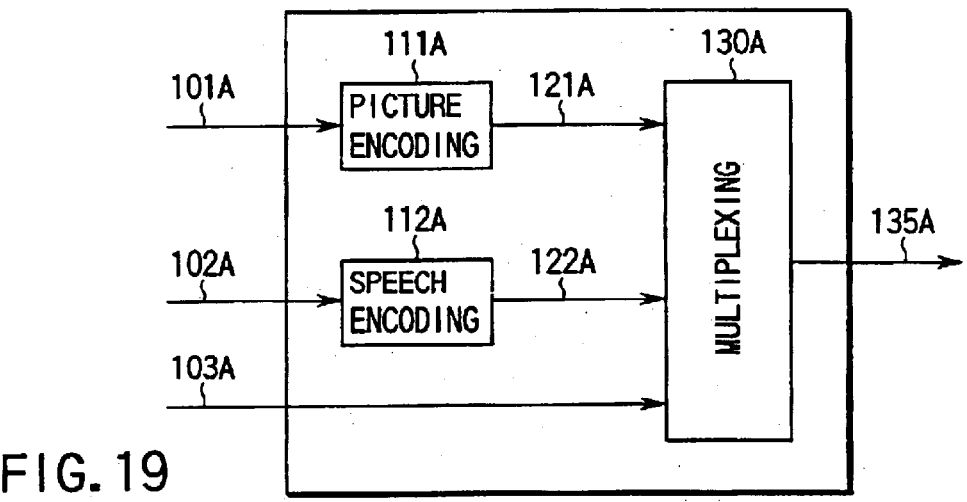
FIG. 19 is a block diagram showing the overall arrangement of a picture/speech encoding apparatus used in an information transmission system according to the third embodiment of the present invention.

FIG. 19 shows the overall arrangement of a video/speech encoder according to the third embodiment of the present invention. A video signal 101A and a speech signal 102A which are to be compress-encoded are respectively input to a video encoder 111A and a speech encoder 112A, which respectively compress the video and speech signals to output a video code stream 121A and a speech code stream 122A. Since the arrangements of the video encoder and the speech encoder are disclosed in detail in a reference (Hiroshi Yasuda, "International Standard for Multimedia Encoding", Maruzen (1994)) and the like, a detailed description thereof will be omitted.

The video code stream 121A and the speech code stream 122A are multiplexed with a data code stream 103A by a multiplexer 130A. As a result, a multiplexing code stream 135A is output.

Figure 20:
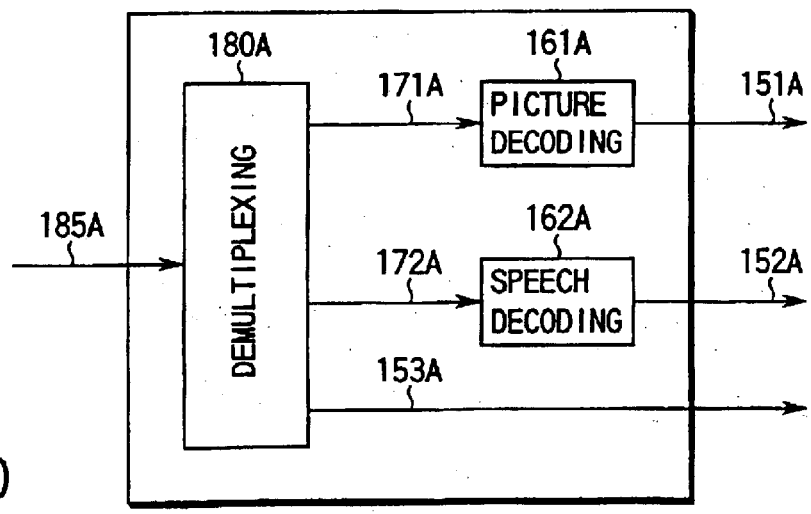
FIG. 20 is a block diagram showing the overall arrangement of a picture/speech decoding apparatus used in the third embodiment.

FIG. 20 shows the overall arrangement of a video/speech encoder corresponding to the video/speech encoder in FIG. 19. A multiplexing code stream 185A from the video/speech encoder is demultiplexed by a demultiplexer 180A. As a result, a video code stream 171A, a speech code stream 172A, and a data code stream 173A are output. The video code stream 171A and the speech code stream 172A are respectively input to a video decoder 161A and a speech decoder 162A to be decoded. As a result, a reconstructed video signal 151A and a reconstructed speech signal 152A are output.

FIGS. 21A and 21B show two examples of the video code stream 121A. The video encoder 111A encodes a signal in units of pictures (frames or VOPs) to generate the video code stream 121A. Each picture is further broken up into small regions referred to as macroblocks to be encoded.

A video code stream of an I picture starts from a picture start code (PSC) 201A (also a VOP start code) which is a code which indicates the picture start position and can be uniquely decoded.

A picture header (PH) 202A (also a VOP header) follows the picture start code 201A. The picture header 202A contains a PTR (Picture Temporal Reference) 221A indicating the temporal position of the picture, a picture coding mode (PCM) 222A indicating the encoding mode of the overall picture, and a picture quantization step size (PQ) 223A. Encoded data 203A of each macroblock follows the picture header 202A.

FIG. 21B shows a case in which encoding is performed in units of slices each constituted by a plurality of macroblocks.

The code stream of each slice contains a resync marker (RM) 210A which indicates the start position of the slice and can be uniquely decoded. A slice header (SH) 211A and macroblock data (MB) 203A of each macroblock follow "RM". The slice header 211A contains an SMBN (Slice Macroblock Number) 231A indicating the number of the first macroblock of the slice, and a quantization step size (SQ) 232A.

The resync marker 210A and the slice header 211A may be added for every predetermined number of bits or at predetermined positions in the picture frame. When encoding is performed to have such a slice structure, even if an error is introduced into a video code stream, resynchronization can be established with the resync marker 210A which can be uniquely decoded. Since an error can be prevented from propagating out of the slice, the quality of the reconstructed picture improves in the event of a transmission path error.

FIG. 22 shows an example of the multiplexing code stream 135A multiplexed by the multiplexer. The multiplexing code stream 135A is constituted by a plurality of multiplexed packets each having a video code-stream (VIDEO), a speech (audio) code stream (SPEECH), and a data/control information code stream (DATA) which are multiplexed to respectively have predetermined sizes. Referring to FIG. 22, sections 301A, 302A, and 303A are multiplexed packets, respectively. All multiplexed packets may be fixed-length packets having the same length (the number of bits), or variable-length packets having different lengths.

A multiplexing start code (MSC) 310A indicating the start position of a multiplexed packet is added to the head of each multiplexed packet. A multiplexed header (MH) 311A, 312A, or 313A follows the multiplexing start code 310A. A multiplexed payload (321A, 322A, or 323A in FIG. 22) obtained by multiplexing the video code stream 121A, the speech code stream 122A, and the data code stream 103A in FIG. 19 in units of packets follows the multiplexed header.

Figure 23A:
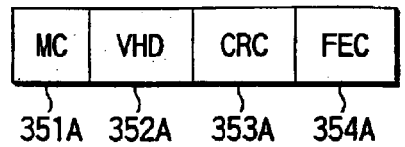
FIGS. 23A and 23B are views showing the first example of the multiplexed header used in the third embodiment.
Figure 23B:
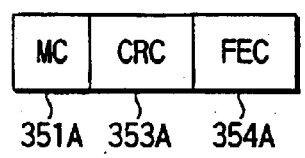

FIGS. 23A and 23B show the first example of the information contained in the multiplexed header (MH) 311A. Referring to FIGS. 23A and 23B, a multiplexing code (MC) 351A is information indicating how a video code stream (Video), a speech code stream (Speech), and a data code stream (Data) are multiplexed in the multiplexed payload 321A. If a transmission path error occurs in this multiplexing code information (MC), the manner in which the code streams are multiplexed cannot be recognized. For this reason, the demultiplexer 180A cannot properly demultiplex the video code stream, the speech code stream, and the data code stream. The video decoder 161A and the speech decoder 162A cannot therefore properly decode either, resulting in a deterioration in the quality of the reconstructed video and speech signals.

To prevent such a situation, strong error protection is provided for each multiplexed header (MH) by using an error check code and an error correction code. Referring to FIGS. 23A and 23B, reference numeral 343A (CRC) denotes a CRC error check bit; and 354A (FEC), an error correction code check bit.

In the third embodiment, the multiplexed header (MH) of a multiplexed packet containing a video code stream (Video) contains video header information (VHD) 352A together with a multiplexing code information (MC). In the case shown in FIGS. 23A and 23B, "MH1" (311A) and "MH2" (312A) are multiplexed headers (MHs) containing the video header information (VHD) 352A. The video header information (VHD) 352A is important information indicating the encoding mode or the like of the overall picture (frame) in video encoding. If an error is introduced into this information, the reconstructed picture greatly deteriorates. If, for example, a video code stream has the format shown in FIGS. 21A and 21B, the picture header 202A or the slice header 211A or part of the information therein is set in a multiplexed header as the video header information (VHD) 352A.

The third embodiment is characterized in that important information such as a picture header in video encoding is inserted in a multiplexed header in this manner, and an error correction code and an error detection code are generated together with a multiplexing code (MC) to provide strong error protection by using these codes. With this characteristic feature, the robustness against transmission path errors improves as compared with the conventional video encoding apparatus which provides no error protection for important information.

Figure 24A:
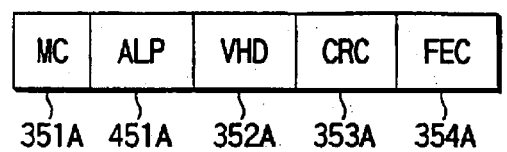
FIGS. 24A and 24B are views showing the second example of the multiplexed header used in the third embodiment.
Figure 24B:
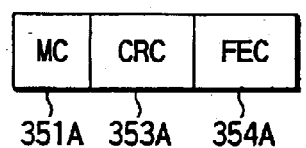

FIGS. 24A and 24B show the second example of the multiplexed header (MH). The same reference numerals in FIGS. 24A and 24B denote pieces of information corresponding to those of the first example shown in FIGS. 23A and 23B, and only the difference between the examples will be described below. The second example differs from the first example in that a multiplexed packet containing a video code stream (Video) has a picture pointer (ALP) 451A which indicates the position of the picture or slice boundary of the video code stream and is contained in the multiplexed header, in addition to the video header information (VHD) 352A.

If the picture pointer (ALP) 451A is not set, the video decoder 161A must detect picture or slice boundaries in accordance with a picture start code or a resync marker after the demultiplexer 180A demultiplexes a video code stream. In contrast to this, if the picture pointer (ALP) 451A is contained in the multiplexed header, picture or slice boundaries can be detected with the picture pointer. Since strong error correction is provided for the picture pointer in the multiplexed header, the probability of correction detection of picture or slice boundaries increases, and the quality of the reconstructed picture is improved.

In addition, the video header information (VHD) 352A may contain all or part of the information contained in a picture or slice header.

Figure 25:
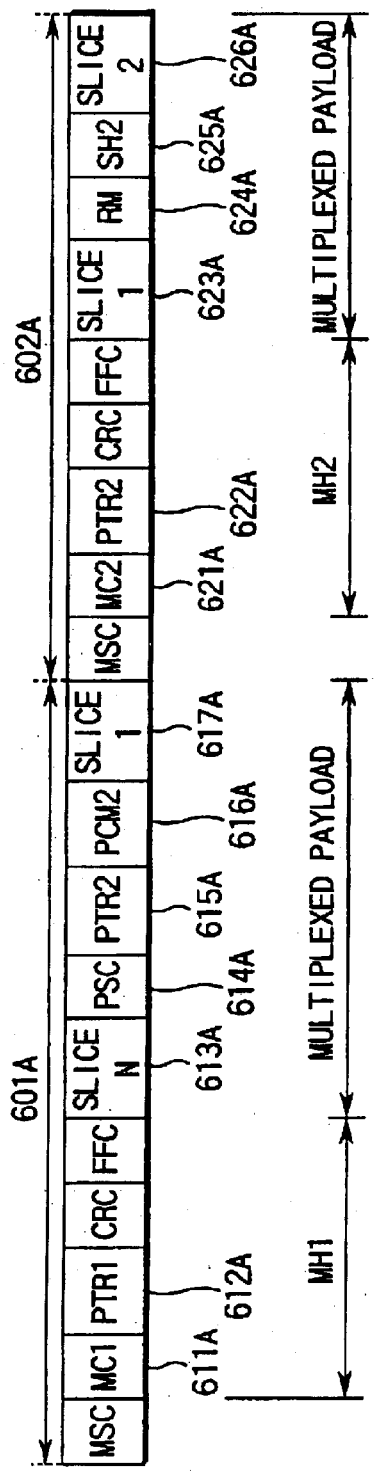
FIG. 25 is a view showing the second example of the multiplexing code stream used in the third embodiment.

FIG. 25 shows a case in which only picture time references (PTR1 and PTR2) 612A and 622A are contained as video header information, in addition to corresponding multiplexing codes (MC1 and MC2) 611A and 621A, in the multiplexed headers of multiplexed packets 601A and 601B containing video code streams (Video).

Referring to FIG. 25, the multiplexed payload of the multiplexed packet 601A contains a slice (Slice N) 613A at the end of the picture code stream with PTR=1, a picture start code (PSC) 614A of the subsequent picture with PTR=2, a picture time reference (PTR 2) 615A with PTR=2, a picture coding mode (PCM2) 616A, and a first half portion (Slice 1) 617A of the first slice of the code stream of the picture with PTR=2. The payload of the multiplexed packet 602A contains a second half portion (Slice 1) 623A of the first slice of the code stream of the picture with PTR=2, a resync marker (RM) 624A of the second slice, a slice header (SH2) 625A, and a second slice (Slice 2) 626A of the code stream of the picture with PTR=2.

The multiplexed header (MH1) of the multiplexed packet 601A contains the PTR 612A of the picture with PTR=1 which has the code stream of the last portion in the multiplexed packet 601A. Error protection is provided for the PTR 612A, together with the multiplexing code (MC1) 611A, by using an error correction code and an error detection code (CRC and FEC). Even if, therefore, the PTR (615A) contained in the video code stream of a multiplexed payload cannot be properly decoded because of an error, since the PTR (612A) in the multiplexed header can be properly decoded, and the correct PTR can be obtained, the decoded picture can be displayed at the correct time.

In a video encoding scheme using a slice structure, if a PTR is inserted in the video header information 352A of a multiplexed packet containing a slice start code (resync marker) and a slice header, picture boundaries can be determined on the basis of the PTR even if the picture start code cannot be properly decoded because of an error. Assume that the picture start code (PSC) 614A or the PART 615A is lost. In this case, the PTR 622A contained in the multiplexed header of the next multiplexed packet is compared with the PTR (e.g., the PTR 612A) contained in the multiplexed header of the preceding multiplexed packet. If they do not coincide with each other, it is determined that a picture boundary is present in the multiplexed packet 601A. In this case, proper encoding can be started from the first slice ("Slice 2" of the RM 624A in FIG. 25) having a resync mark in the multiplexed packet 602A.

When an encoding scheme in which the picture encoding mode is frequency changed (e.g., an encoding scheme using B pictures) is used, picture coding mode information may be contained in a multiplexed header.

Figure 26:
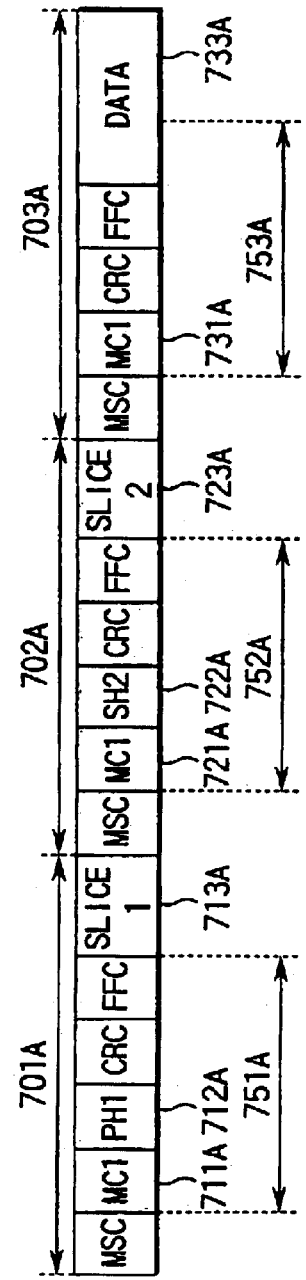
FIG. 26 is a view showing the third example of the multiplexing code stream used in the third embodiment.

FIG. 26 shows the third example of the multiplexing code stream. In this multiplexing code stream, a picture or slice is set in each of multiplexed packets 701A, 702A, and 703A, and error protection is provided for a picture header (PH1) 712A and a slice header (SH2) 722A in multiplexed headers 751A and 752A, together with multiplexing codes (MC1 and MC2) 711A and 721A. If pictures or slices as video codes and multiplexed packets are prepared in pairs, since it is uniquely known that each multiplexed packet is always located at a picture or slice start position, neither a picture start code nor a resync marker need be detected from the demultiplexed picture code stream. As a result, the processing amount can be reduced. In addition, the use of a code highly robust against transmission path errors as a multiplexing start code will reduce the probability that the start position of a picture or slice cannot be properly specified, and the picture or slice cannot be decoded.

In the third embodiment, one picture/speech signal is encoded/decoded. However, the present invention can be equally applied to a case in which a plurality of picture/speech signal encoding apparatuses are used to encode/multiplex a plurality of picture/speech signals, and a plurality of picture/speech signal decoders are used to demultiplex/decode a plurality of picture/speech signals. In this case, the video header information contained in multiplexed header information may contain information for identifying a plurality of picture signals.

If a transmission code stream is generated by properly combining the third embodiment with the first and second embodiments, more reliable transmission of encoded information can be realized. In the third embodiment, a PTR (Picture Time Reference) indicating the time may be handled as a modulo time base and a VOP time increment like those in the second embodiment. By using these pieces of information, a check may be performed using the regularity of the modulo time base and the VOP time increment as in the second embodiment.

A medium for storing information generated in the present invention will be described in detail next.

Figure 29:
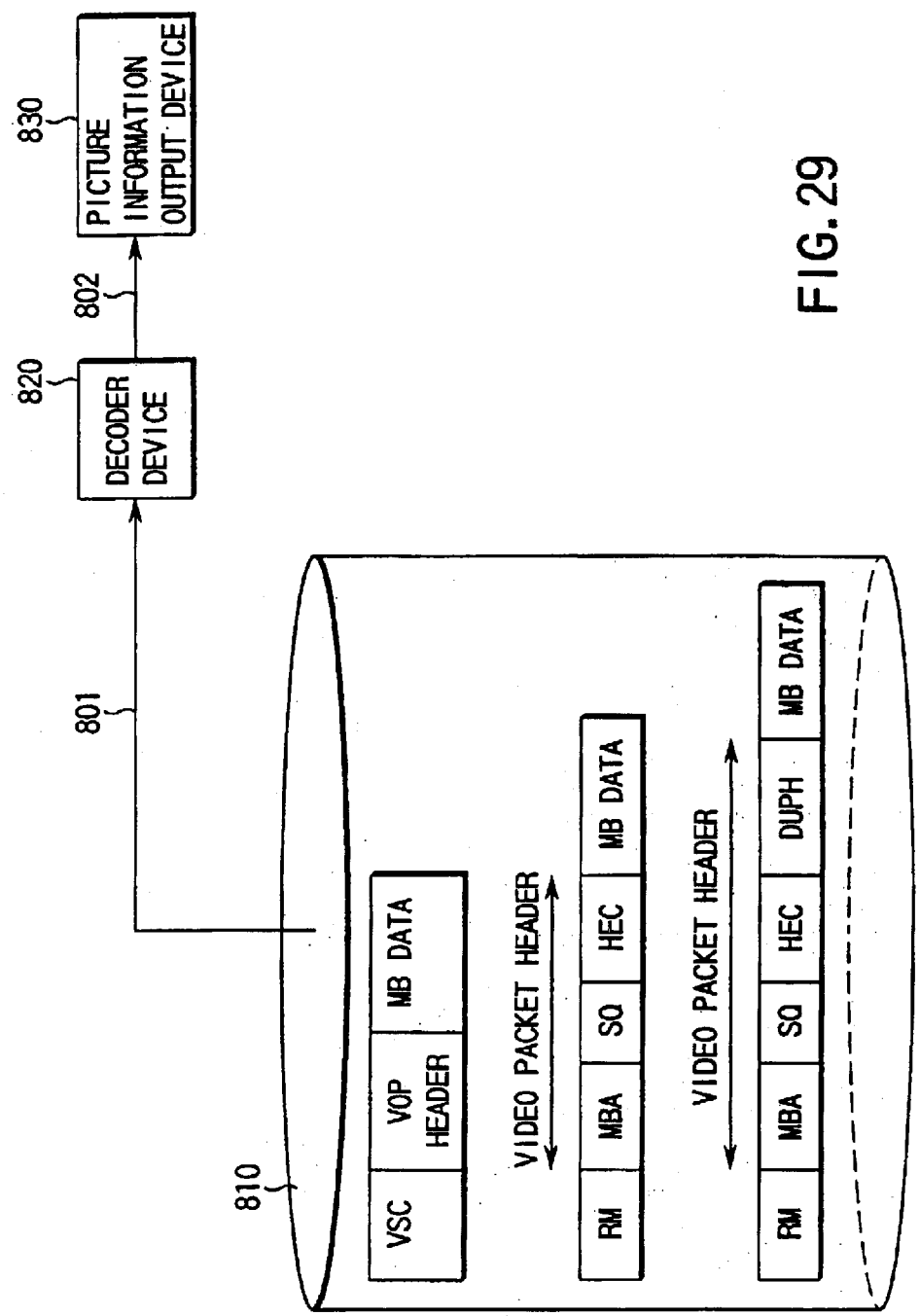
FIG. 29 is a block diagram showing a medium on which information based on the present invention is recorded and a decoding apparatus for the medium.

FIG. 29 shows a system for reconstructing a picture signal by using a recording medium 810 in which the picture code streams output from the encoding apparatus of the present invention are stored. Code streams containing the picture code streams encoded by the picture encoding apparatus of the present invention are stored in the recording medium 810. A decoder apparatus 820 reconstructs a picture signal from a code stream stored in the recording medium 810. A picture information output apparatus 830 outputs a reconstructed picture. When, for example, picture information recorded on a recording medium from which information can be read out by a computer is to be reconstructed by a personal computer or the like, the bit stream of the picture information is read out from the recording medium, and the bit stream can be processed by software by using a picture reconstruction program. In this case, for example, the picture information output apparatus 830 is a display or the like. The reconstructed picture signal may be recorded on a storage medium (not shown) or transmitted to another apparatus or system through a transmission path (not shown).

In this system having the above arrangement, a code stream having a format like that in each of the embodiments described above is stored in the recording medium 810. This code stream is characterized in that part of VOP (also a picture or frame) header information is recorded as duplex information on part of a video packet (or a slice, a GOB, or the like) header. The decoder apparatus 820 reconstructs a picture signal from the code stream stored in the recording medium 810. That is, the decoder apparatus 820 reads the code stream through a signal line 801, and generates a reconstructed picture by the procedure shown in FIG. 30.

The contents of processing in the decoder apparatus 820 will be described below with reference to FIG. 30.

The decoder apparatus 820 sequentially reads out picture code streams from the recording medium 810, and detects a sync code first (step S11). If the detected sync code is a VOP start code (YES in step S12), the immediately preceding decoded VOP (frame) is output to the picture information output apparatus 830 (step S13). The decoder apparatus 820 decodes the VOP header ("VOP header" in FIG. 29) following the VOP start code in the picture code (step S14). If the VOP header is properly decoded (YES in step S15), the information recorded on the buffer memory in the decoder apparatus 820 is replaced with the decoded VOP header information (time information, VOP prediction mode information, and the like) (step S16). The decoder apparatus 820 then decodes the macroblock data ("MB data" in FIG. 29) following the VOP header, and decodes the video packet (step S17).

If the detected sync signal is a resync marker (YES in step S18), the decoder apparatus 820 decodes the video packet header (macroblock number (MBA), the video packet quantization parameter (SQ), and the header expansion code (HEC)) following the resync marker (RM) (step S19). If the header expansion code HEC in the video packet header is "0" (NO in step S20), the decoder apparatus 820 decodes the video packet (step S17). If the header expansion code HEC is "1" (YES in step S20), the decoder apparatus 820 decodes the subsequent duplexed information ("DUPH" in FIG. 29) (step S21). If the duplexed information can be properly decoded (YES in step S22), the duplexed information is compared with the information held in the buffer memory (step S23). If they coincide with each other (NO in step S23), the decoder apparatus 820 decodes the macroblock data ("MB data" in FIG. 29) following the video packet header, and decodes the video packet (step S17). If they do not coincide with each other (YES in step S23), the decoder apparatus 820 determines that this video packet belongs to a VOP different from the immediately preceding decoded VOP, and outputs the immediately preceding decoded VOP to the picture information output apparatus 830 (step S24). The decoder apparatus 820 then replaces the information recorded on the buffer memory with the decoded duplexed information (step S25), and decodes the video packet (step S17).

Figure 30:
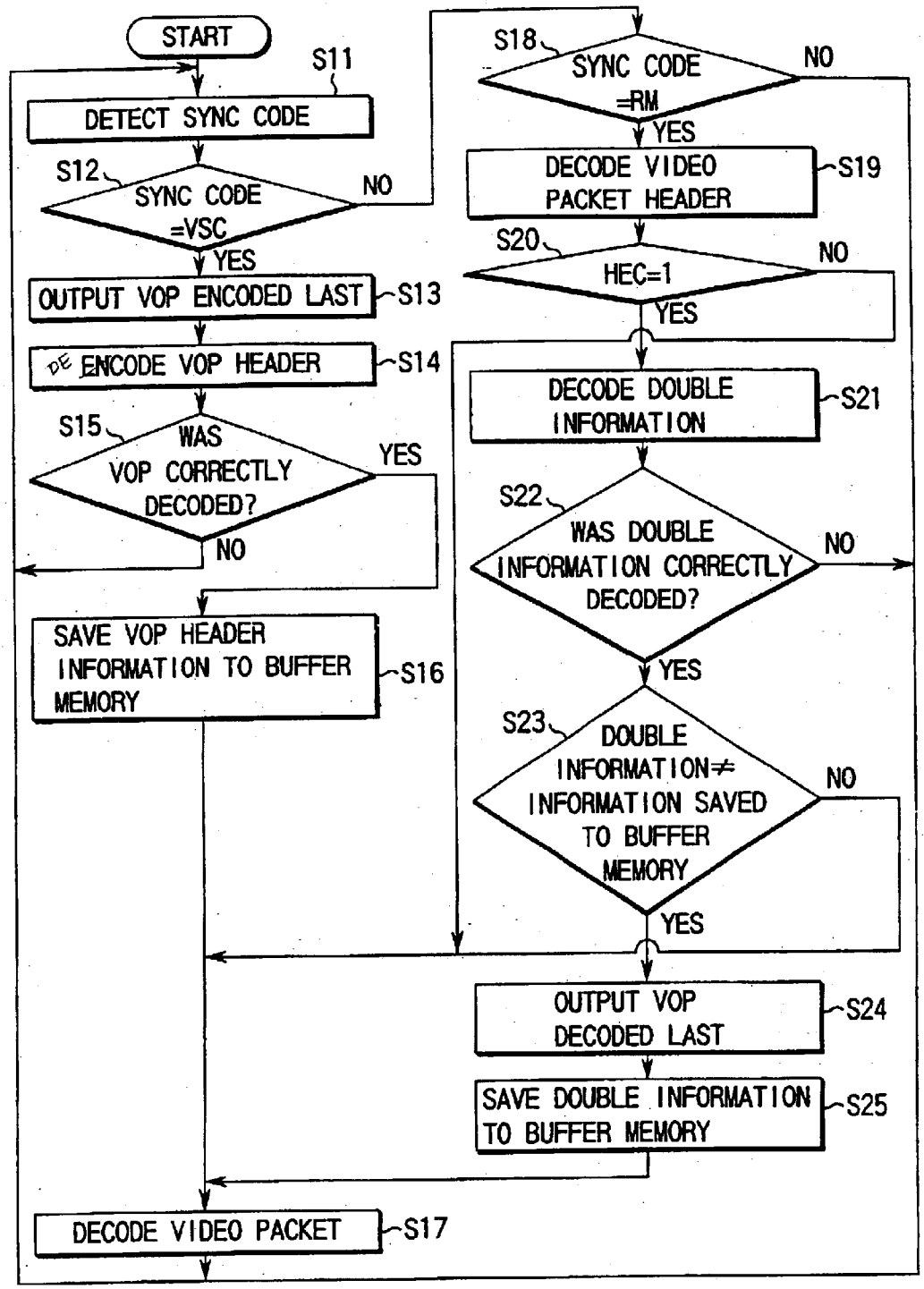
FIG. 30 is a flow chart showing a procedure for decoding the information recorded on the medium in FIG. 29.

The above series of operations starting from sync code detection in FIG. 30 is repeated while the picture code streams recorded on the recording medium 810 are sequentially read out, thereby reconstructing the video signal.

Note that code streams obtained by multiplexing code streams obtained by encoding speech and audio signals, data, control information, and the like may be recorded on the recording medium instead of recording picture code streams on the recording medium without any modification. In this case, before the information recorded on the recording medium is decoded by the decoder apparatus 820, the picture code streams, the speech/audio code streams, the data, and the control information are demultiplexed by a demultiplexer, and the demultiplexed picture code streams are decoded by the decoder apparatus 820.

In the case shown in FIG. 29, the information recorded on the recording medium 810 is transmitted to the decoder apparatus 820 through the signal line 801. However, the information may be transmitted through a transmission path, other than the signal path, e.g., a wire/radio/infrared transmission path.

As described above, according to the present invention, since important information in each code stream recorded on the recording medium is duplexed and recorded, even if an error occurs in the information recorded on the recording medium, or an error occurs in a signal line or a transmission path through which the information recorded on the recording medium is sent to a reconstructing apparatus, a picture with little deterioration can be reconstructed.

The fourth embodiment of the present invention will be described next.

The overall arrangements of a video/speech encoding apparatus and a video/speech decoding apparatus according to this embodiment are the same as those shown in FIGS. 19 and 20. However, the operations of the respective sections are different from those in the third embodiment. This different point will be mainly described below.

FIGS. 34A to 34C show three examples of a video code stream 121A. A video encoder 111A performs encoding in units of VOPs (also pictures, frames, and fields) to generate the video code stream 121A. The picture is further segmented into small regions referred to as macroblocks to be encoded.

A video code stream of one VOP starts from a VOP start code ("VSC" in FIGS. 34A to 34C) (also a picture start code) which is a sync code that can be uniquely decoded: A VOP header ("VH" in FIGS. 34A to 34C) (also a picture header) follows the VOP start code. The VOP header contains information indicating the time of the VOP, VOP encoding mode information, VOP quantization step size information, and the like. Encoded data of each macroblock follows the VOP header.

FIG. 34A shows a case in which the VOP is segmented into encoding units referred to as video packets (also slices and GOBs) to be encoded. Each video packet is constituted by one or a plurality of macroblocks ("MB data" in FIG. 34A). When video encoding is to be performed by using prediction over a plurality of macroblocks, like prediction of the motion vector of the macroblock of interest from the motion vectors of adjacent macroblocks, prediction may be performed from only macroblocks contained in the same video packet to prevent any transmission path error from affecting other video packets.

A code stream of each video packet other than the first video packet of a VOP starts from a resync marker (RM) (also a slice start code and a GOB start code), which is a sync code that can be uniquely decoded, and a video packet header (VPH) (also a slice header and a GOB header). Data (MB data) of each macroblock follows these codes. The video packet header contains a macroblock number (or a slice number or a GOB number) indicating the position of the first macroblock in the video packet, the quantization step size information of the video packet, and the like. This header may also contain important information such as VOP header information as in the second embodiment.

FIG. 34B shows an example of the code stream obtained by encoding a video code stream upon segmenting it into two pieces of information, i.e., information about the prediction mode and the motion vector and information about a residual error signal in motion compensation adaptive prediction or an orthogonal transform (DCT or the like) coefficient obtained by calculating the orthogonal transform of the residual error signal. In a code stream of each video packet, information ("Motion" in FIG. 34B) about the prediction mode and motion vector is set near the reader side (immediately after the video packet header or the VOP header in FIG. 34B), and information ("Texture" in FIG. 34B) about the prediction residual error DCT coefficient is set near the tail side. The two types of information are separated from each other by a motion marker ("MM" in FIG. 34B).

FIG. 34C shows an example of the code stream obtained by a video encoding scheme of encoding a picture together with information about the shape of the picture to be encoded. Referring to FIG. 34C, "Shape" is shape information, which is set before information (Motion) about the prediction mode and motion vector in each video packet (in the case shown in FIG. 34C, this shape information is set immediately after the video packet header or the VOP header). The shape information (Shape) and the information (Motion) about the prediction mode and motion vector are separated from each other by a shape marker ("SM" in FIG. 34C).

In the video code streams shown in FIGS. 34A to 34C, sync codes such as start codes and resync markers are preferably set at bit positions corresponding to integer multiples of a given number of bits. In the codes shown in FIGS. 35A and 35B, the VOP start codes (VSCs) and the resync markers (RMs) at the heads of the respective video packets are set at the positions corresponding to integer multiples of N bits. With this processing, the number of positions at which sync codes are detected by the decoding apparatus can be reduced 1/N that in the encoding scheme in which sync codes are arranged at arbitrary positions. With this processing, synchronization detection in the decoding apparatus can be simplified. In addition, the probability of a phenomenon called pseudo-synchronization, in which a bit pattern (pseudo-sync code) identical to a sync code is generated owing to a transmission path error, and is erroneously detected as a sync code, can be reduced to 1/N. The quality of the decoded picture improves even in the event of a transmission path error.

To set sync codes at predetermined positions in this manner, stuffing bits ("Stuffing bits" in FIG. 35A) are inserted between each sync code and the information immediately before each sync code. FIG. 35B shows an example of the code table of stuffing bits with N=8. These stuffing bits are characterized in that they can be uniquely decoded in the reverse direction of the code stream, and the lengths of stuffing bits can be specified in the decoding apparatus, unlike stuffing bits or the like constituted by only bits "0" which have been widely used in the prior arts. In the case shown in FIG. 35B, the first bit of stuffing bits is "0", but the remaining bits are "1". For this reason, the last bit of stuffing bits, i.e., the first bit "0" that appears first when the bits immediately before a sync code are sequentially read in the reverse direction, can be determined as the first bit of the stuffing bits.

Since the position of the first bit of stuffing bits can be specified in this manner, the introduction of a transmission path error into a code stream can be easily detected in the decoding apparatus. When a code stream is properly decoded, the decoding end position of the data immediately before stuffing bits should coincide with the start position of the stuffing bits. If the decoding end position does not coincide with the start position of the stuffing bits, it may be determined that a transmission path error has been introduced into the code stream, and the code stream may not be decoded.

When a code stream is to be decoded in the reverse direction by using a variable-length code which can be decoded in the reverse direction, the start position of reverse decoding must be specified in the decoding apparatus. The decoding start position of stuffing bits corresponds to the bit immediately before the stuffing bits. In the prior arts, for example, the length of stuffing bits constituted by only bits having the same bit value cannot be specified, and hence the start position of reverse decoding cannot be detected in the decoding apparatus. In contrast to this, the stuffing bits in FIGS. 35A and 35B allow the position of the first bit to be specified, and hence the start position of reverse decoding can be specified.

Consider a code word containing many "0" s like a sync code "00000000000000001". With stuffing bits constituted by only "0"s as in the prior art, the probability of generating a bit pattern identical to the sync code upon introduction of an error is high, and hence pseudo-synchronization tends to occur. In contrast to this, with the stuffing bits shown in FIGS. 35A and 35B, the probability of pseudo-synchronization is low because all the bits of the stuffing bits are "1" except for the first bit, and the Hamming distance from the sync code is large.

As described above, stuffing bits are generated in accordance with a predetermined rule. In the decoding/demultiplexing apparatus, therefore, the stuffing bits in a multiplexing code stream are collated with the rule, and occurrence of an error in the multiplexing code stream can be determined, if it is determined that the stuffing bits are discordant with the rule. With this operation, the decoding/demultiplexing apparatus can perform processing to prevent a considerable deterioration in a demultiplexed/decoded signal to improve the quality of the decoded signal even when an error is introduced into the multiplexing code stream.

In addition to VOP start codes and resync markers, motion markers (MM) and shape markers (SM) may be set at bit positions corresponding to integer multiples of a given number of bits, and stuffing bits like those in FIG. 35B may be set before these markers. With this setting, error detection and reverse encoding can be performed with respect to shape information, prediction mode information, motion vector information, and the like.

Figure 36:
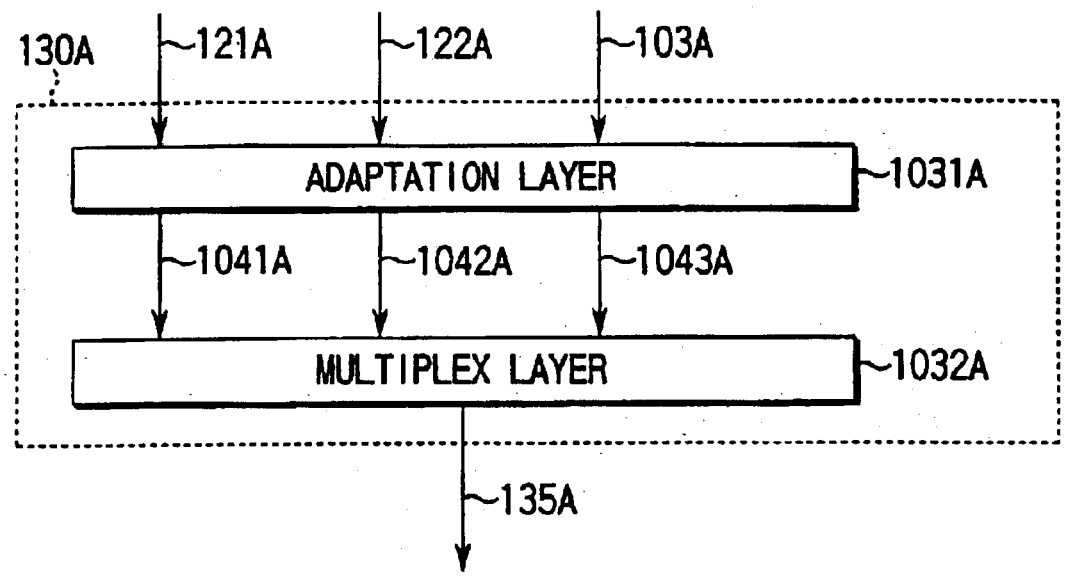
FIG. 36 is a block diagram showing the arrangement of a multiplexer in the fourth embodiment.

FIG. 36 shows an example of the arrangement of a multiplexer 130A. In the example shown in FIG. 36, multiplex processing is performed on two layers called an adaptation layer 1031A and a multiplex layer 1032A. A video code stream 121A, a speech code stream 122A, and a data code stream 103A are input to the adaptation layer 1031A. Outputs 1041A, 1042A, and 1043A having undergone the processing on the adaptation layer 1031A are input to the multiplex layer 1032A. A multiplexing code stream 135A is output from the multiplex layer 1032A.

Figure 37:
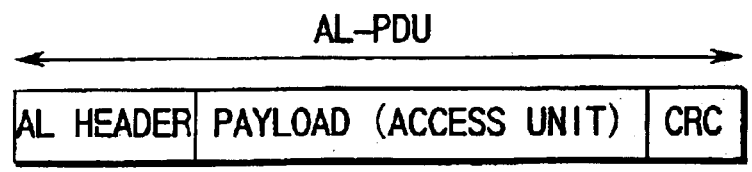
FIG. 37 is a view showing an example of the output from an adaptation layer in the fourth embodiment.

FIG. 37 shows an example of the output code stream 1041A obtained by processing the video code stream 121A on the adaptation layer 1031A. The processing on the adaptation layer 1031A is performed in units of AL-SDUs (also access units) obtained by breaking up the video code stream 121A into certain units. The output obtained by processing one AL-SDU on the adaptation layer is called an AL-PDU. FIG. 37 shows the format of one AL-PDU. An AL header is added to each AL-PDU. The AL header may contain information indicating the number and attributes of the AL-PDU, the video encoding/multiplexing mode, and the like. An AL-SDU as an AL payload follows the AL header. A check bit, e.g., a CRC check bit, for detecting whether a transmission path error is introduced into the AL-PDU may be set behind the AL-SDU.

On the adaptation layer 1031A, the video code stream 121A and the data code stream 103A are processed in the same manner as described above to output the AL-PDUs 1042A and 1043A corresponding to the speech code stream and the data code stream. Note, however, that the information set in each AL header, the length and presence/absence of a CRC check bit, and the like may differ from those in the AL-PDU 1041A corresponding to the video code stream.

The AL-PDUs 1041A, 1042A, and 1043A generated on the adaptation layer 1031A are multiplexed on the multiplex layer 1032A. Multiplexing is performed in units of MUX-PDUs. FIGS. 38A to 38C show examples of the MUX-PDU obtained by multiplexing. A multiplexed sync code (MUX flag) and a multiplexed header (MUX header) are added to the MUX-PDU. The multiplexed header may contain information indicating the types of outputs from the adaptation layer, which are multiplexed with the MUX-PDU, the manner of multiplexing them, the length of the MUX-PDU, and the like.

FIG. 38A shows a case in which one AL-PDU is set in one MUX-PDU.

FIG. 38B shows a case in which one AL-PDU is divided into a plurality of (two in this case) MUX-PDUs. In this case, each multiplexed header may contain information indicating the ordinal number of the divided AL-PDU portion, contained in the MUX-PDU, in the overall AL-PDU, or indicating whether the divided AL-PDU portion is the first or last portion of one AL-PDU.

FIG. 38C shows a case in which a plurality of AL-PDUs are set in one MUX-PDU. In the case shown in FIG. 38C, an AL-PDU (Video AL-PDU) corresponding to a video code stream and an AL-PDU (Audio AL-PDU) corresponding to a speech code stream are multiplexed. In this case, the multiplexed header may contain information indicating the boundary between the plurality of AL-PDUs contained in the MUX-PDU. Alternatively, an identifier indicating a boundary may be set at the boundary between the AL-PDUs.

As described above, on the adaptation layer, a code stream is processed in units of AL-SDUs or access units. FIGS. 39A to 39C show examples of how a video code stream is segmented on the adaptation layer.

FIGS. 39A to 39C each show a case in which one VOP is set as one access unit. FIGS. 39A to 39C respectively correspond to the video code streams in FIGS. 34A to 34C.

Figure 40A:
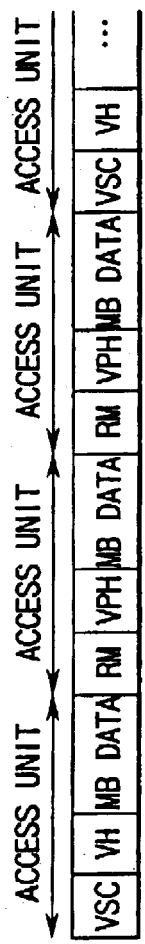
FIGS. 40A to 40C are views each showing the second example of how a video code stream is segmented on the adaptation layer in the fourth embodiment.
Figure 40B:
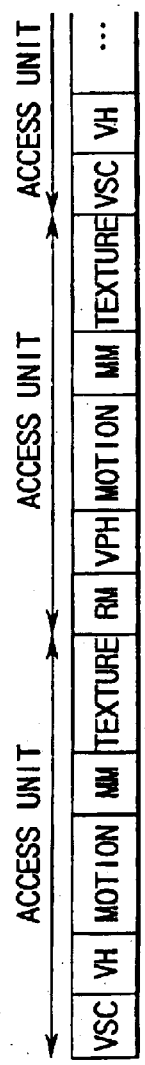
Figure 40C:
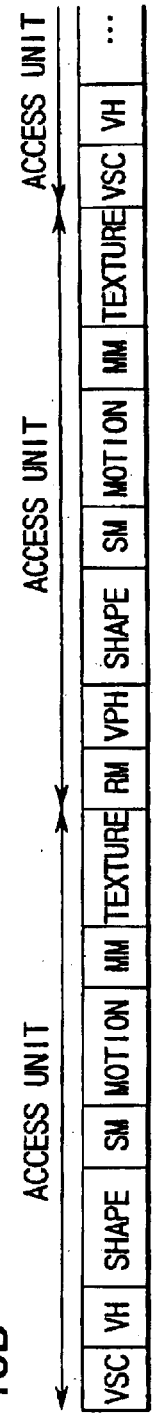

FIGS. 40A to 40C each show a case in which one video packet is set as one access unit. FIGS. 40A to 40C respectively correspond to the video code streams in FIGS. 34A to 34C.

Figure 41A:
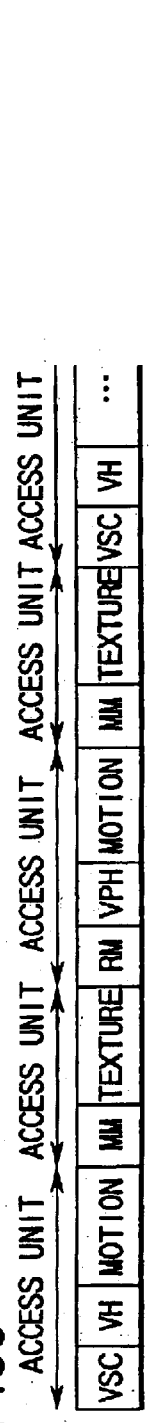
FIGS. 41A and 41B are views each showing the third example of how a video code stream is segmented on the adaptation layer in the fourth embodiment.
Figure 41B:
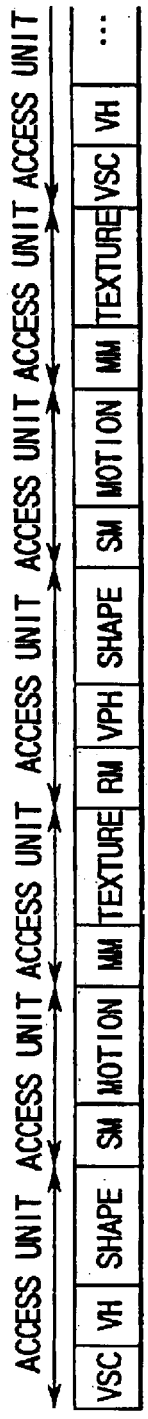

When a video packet is to be encoded upon being segmented into shape information, motion vector information, and DCT coefficient information, as shown in FIGS. 34B and 34C, an access unit may also be segmented accordingly. FIGS. 41A and 41B respectively correspond to the video code streams in 34B and 34C. Motion markers (MM) and shape markers (SM) indicating boundaries are set between shape information (Shape), information (Motion) about the prediction mode and motion vector, and information (Texture) about a residual error signal and a DCT coefficient to generate access units.

Figure 44A:
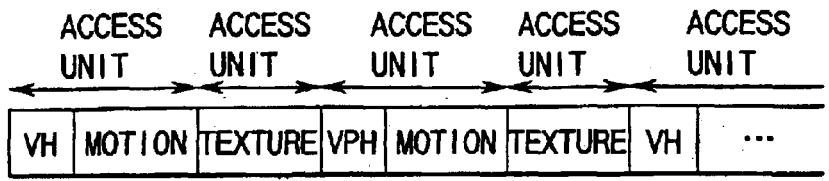
FIGS. 44A and 44B are views each showing the sixth example of how a video code stream is segmented on the adaptation layer in the fourth embodiment.
Figure 44B:
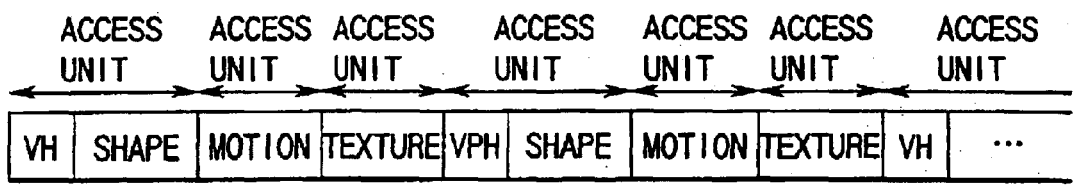

When multiplexed sync codes, AL boundary identifiers, and the like, which indicate the boundaries between MUX-PDUs or AL-PDUs are added to a code stream on the multiplex layer, as described above, the start positions of the respective access units can be discriminated from these codes and identifiers. In this case, the sync codes at the heads of the access units may be removed from the video code stream. FIGS. 42A to 42C each show a case in which one VOP is set as one access unit. In this case, the VOP start code at the head of the VOP may be removed. FIGS. 43A to 43C each show a case in which one video packet is set as one access unit. In this case, the VOP start code and the resync marker at the head of each video packet may be removed. FIGS. 44A and 44B each show a case in which shape information (Shape), information (Motion) about the prediction mode and motion vector, and information (Texture) about a residual error signal and a DCT coefficient each form an access unit. In this case, the VOP start code and the resync marker at the head of each video packet and motion makers (MM) and shape markers (SM) indicating the boundaries between "Shape", "Motion", and "Texture" may be removed.

Figure 45A:
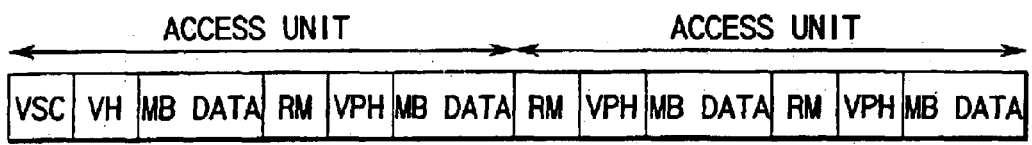
FIGS. 45A and 45B are views each showing the seventh example of how a video code stream is segmented on the adaptation layer in the fourth embodiment.
Figure 45B:
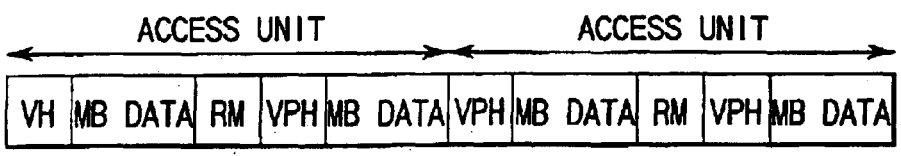

As shown in FIGS. 45A and 45B, one or a plurality of video packets may be set in one access unit. In this case, as shown in FIG. 45B, only the VOP start code or the resync maker at the head of each access unit may be removed. Similarly, in the video code streams shown in FIGS. 34B and 34C, each access unit may be constituted by a plurality of video packets.

When a video packet is to be encoded upon being segmented into "Shape", "Motion", and "Texture", as shown in FIGS. 34B and 34C, each access unit may be constituted by a set of Shape data, Motion data, or Texture data of a plurality of video packets. FIGS. 46A to 46D each show a case in which such processing is performed with respect to the code stream in FIG. 34B, and each access unit is constituted by a set of Motion data or Texture data. A VOP header and a video packet header are set before "Motion" in each video packet.

Access units may be constituted by sets of "Motion" and "Texture" in units of VOPs or an arbitrary number of video packets.

Figure 46A:
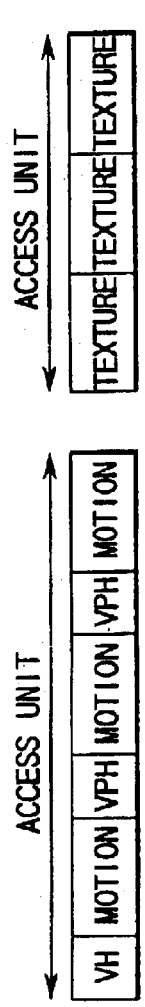
FIGS. 46A to 46D are views each showing the eighth example of how a video code stream is segmented on the adaptation layer in the fourth embodiment.
Figure 46B:
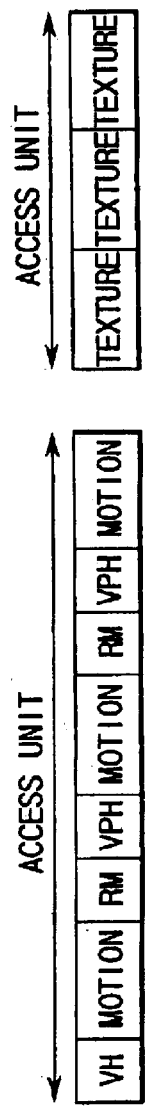
Figure 46C:
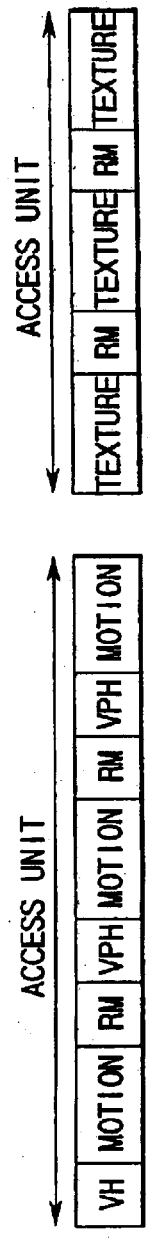
Figure 46D:
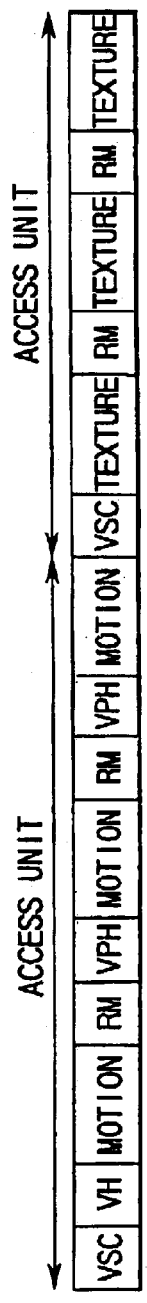
Figure 47:
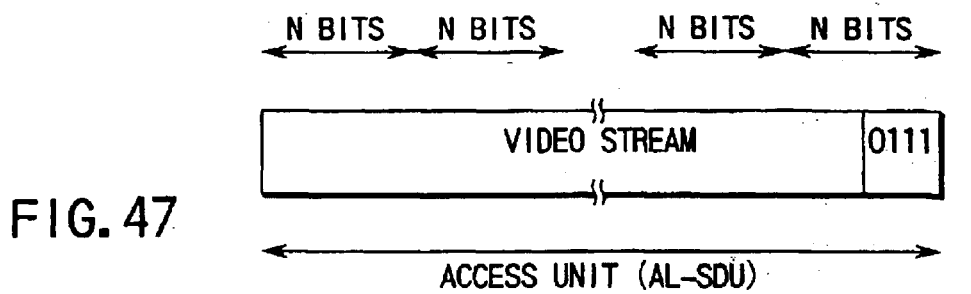
FIG. 47 is a view for explaining an example of how stuffing is performed on the adaptation layer in the fourth embodiment.

In such an access unit format, a sync code may be set at the boundary between "Motion" and "Texture" of video packets. FIG. 46B shows a case in which sync codes (RM) are set at the boundaries between the Motion data. FIGS. 46C and 46D each show a case in which sync codes (RM) are set at the boundaries between the Motion data and between the Texture data. FIG. 46D shows a case in which a sync code (VSC) is set at the head of each access unit. Different sync codes may be used for "Motion" and "Texture". For example, a motion marker may be used for "Motion", and a resync marker for "Texture".

In the video code stream shown in FIG. 34C as well, each access unit may be constituted by a set of Shape data, Motion data, or Texture data.

As described above, each access unit is formed by collecting code streams, from code streams having different degrees of importance, e.g., "Shape", "Motion", and "Texture", which have the same degree of importance, and error protection of different degrees (e.g., using error correction and detection codes and performing retransmission) is provided for each access unit. With this operation, error protection can be performed in accordance with the degrees of importance of the respective code streams, improving the quality of the decoded picture in the event of a transmission path error. In general, when a transmission error is introduced into shape information (Shape) or mode information or motion vector information (Motion), the quality of the decoded picture greatly suffers. To prevent this, error correction codes suited for shape and Motion may be used to provide strong error protection. In contrast to this, even if a transmission path error is introduced into a residual error signal (Texture), the picture quality doest not deteriorate much. Error protection to be provided need not be very strong, and hence the redundancy due to error correction codes, error detection codes, and the like can be reduced.

In the above case in which sync codes are removed from video code streams, the multiplexer 130A may remove the sync codes contained in the video code stream 121A, or the video code stream 121A from which the sync codes are removed by the video encoder 111A in advance may be supplied to the multiplexer.

In any of the cases shown in FIGS. 39A to 46D, the length of each access unit may be set to an integer multiple of a predetermined length (e.g., in bytes). As in the case shown in FIGS. 35A and 35B, when a video code stream is segmented into video packets or VOPs in units of N bits (e.g., bytes) with stuffing bits being set before each resync marker or each start code, if each access unit contains these stuffing bits, the length of each access unit can be set to an integer multiple of a predetermined length (e.g., in bytes).

If such processing is not performed for a video code stream, stuffing bits may be added to the end of each access unit to set the length of each access unit to an integer multiple of a predetermined length (e.g., in bytes). As the stuffing bits, those shown in FIG. 35B may be used. In this case, an error introduced into the code stream can be detected by using the stuffing bits as in the case in which the stuffing bits are inserted in a video code stream. In addition, stuffing bits may be added to speech and data code streams, in addition to a video code stream, to set the length of each access unit to an integer multiple of a predetermined length (e.g., in bytes).

On the multiplex layer, when the multiplexed payload contains the same bit pattern as that of the multiplexed sync signal, the demultiplexer erroneously determines that this pattern is a multiplexed sync code. As a result, the boundary between MUX-PDUs is erroneously detected. That is, pseudo-synchronization (also emulation) may occur. If the video encoder generates a video code stream in which no bit pattern identical to that of a sync code (e.g., a VOP start code or a resync marker) in the video code stream is generated at a portion other than each sync code, it can be detected by using a video sync code whether pseudo-synchronization has occurred on the multiplex layer.

The head position of an MUX-PDU is adjusted to the head position of an AL-PDU to form an MUX-PDU. FIGS. 38A to 38C each show such a format. A video sync code is added to the head of each AL-SDU (access unit). With this arrangement, a multiplexed sync code and a video sync code are arranged to be adjacent to each other through a multiplexed header or an AL header. If a multiplexed sync code is erroneously detected by the demultiplexing apparatus, the apparatus proceeds to the detection of a multiplexed header, an AL header, and a video sync code adjacent to the detected code. However, since the detected code is a pseudo-sync code, if the detected pieces of information are decoded as a multiplexed header, an AL header, and a video sync code, wrong pieces of information are obtained. For this reason, the demultiplexer checks whether the decoded multiplexed header, AL header, and video sync code are correct pieces of information. If it is determined that they are not correct, the detected multiplexed sync code is determined as a pseudo-sync code.

Figure 48:
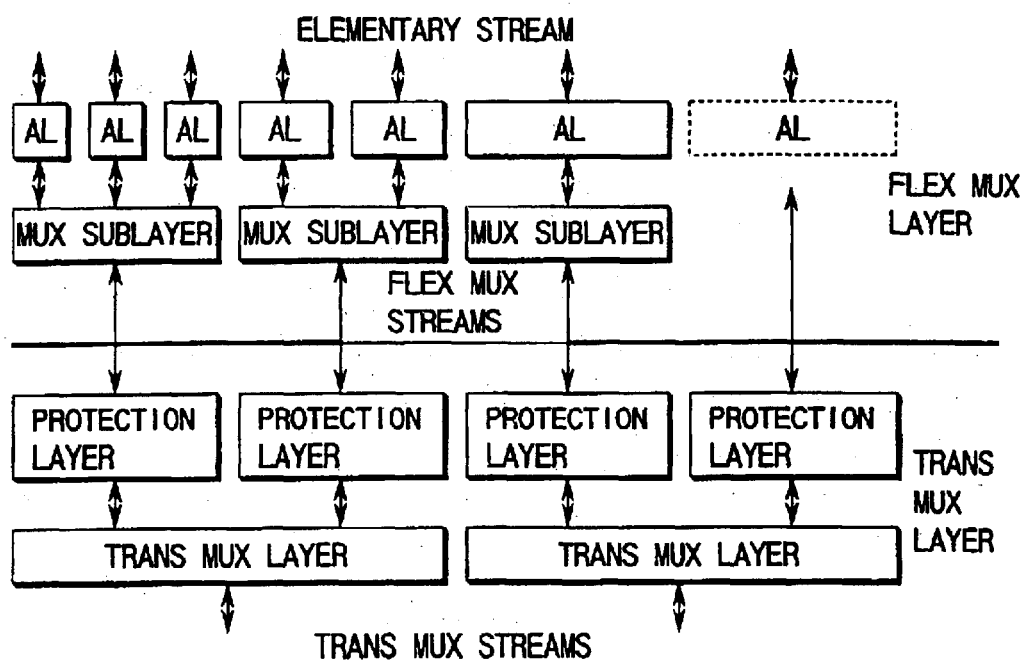
FIG. 48 is a block diagram showing the second example of the arrangement of the multiplexer in the fourth embodiment.

FIG. 48 shows the second example of the arrangement of the multiplexer. In this example, the multiplexer is divided into two layers, i.e., a FlexMux layer and a TransMux layer. The FlexMux layer is divided into an adaptation sub-layer (AL) and a Mux sub-layer. The TransMux layer is divided into a Protection sub-layer and a TransMux sub-layer.

Figure 49:
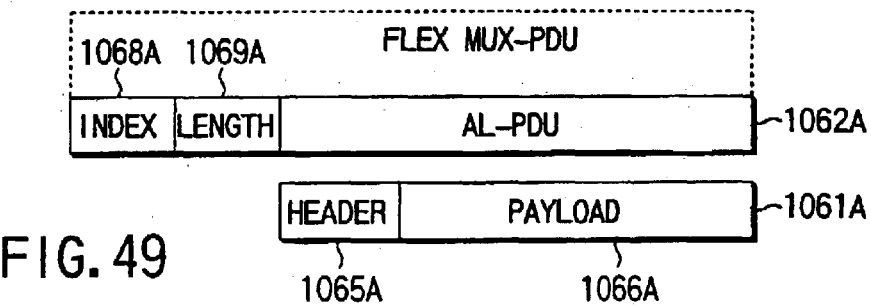
FIG. 49 is a view showing an example of the code stream generated on the FlexMux layer of the multiplexer having the arrangement shown in FIG. 48 in the fourth embodiment.

FIG. 49 shows a code stream generated on the FlexMux layer. Reference numerals 1061A and 1062A respectively denote code streams generated on the adaptation sub-layer and the Mux sub-layer. An AL header (Header) 1065A containing information indicating the type of information to be multiplexed, information indicating the time, and the like is input to the adaptation sub-layer. In addition, a payload 1066A (Payload) containing video, speech, and data code streams to be multiplexed is multiplexed to generate an AL-PDU. On the Mux sub-layer, an index 1068A indicating the type and channel number of the AL-PDU and information (length) 1069A indicating the length of the AL-PDU are added to generate a FlexMux-PDU.

The FlexMux-PDU generated on the FlexMux layer is input to the TransMux layer. The TransMux layer may use the arrangement of the multiplexer in FIG. 36. In this case, a protection sub-layer corresponds to the adaptation layer 1031A in FIG. 36, and a transmax sub-layer corresponds to the multiplex layer 1032A in FIG. 36. Alternatively, the arrangement shown in FIG. 36 may be used for the transmax sub-layer, and the protection sub-layer may not be used.

Note that the arrangement for multiplexing unit code streams each having a length set to an integer multiple of a predetermined length by stuffing bits, and the arrangement for collecting sync words having the same degree of importance to form an access unit can be applied to the structures of the multiplexing code streams in the first to third embodiments.

Figure 50:
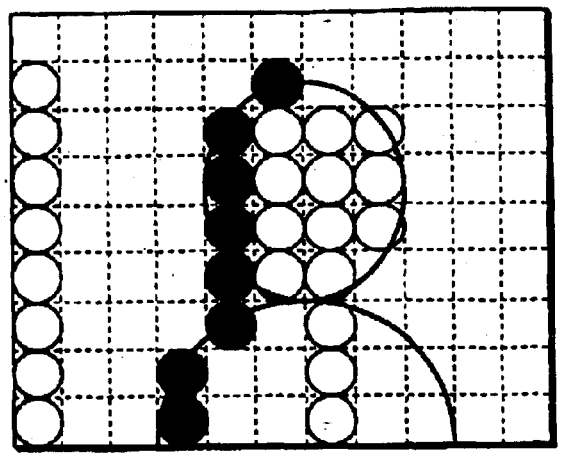
FIG. 50 is a view for explaining the boundaries between the access units and another example of the arrangement of resync markers in a frame in the fourth embodiment.

When a plurality of video packets are set in one access unit as in the case shown in FIGS. 45A and 45B, the boundaries between access units and resync markers may be arranged in a frame in the manner shown in FIG. 50. Referring to FIG. 50, each hollow bullet indicates a macroblock with a resync marker (i.e., the first macroblock of each video packet), and each full gray bullet indicates the position of the first macroblock in each access unit. In such a picture, since the human figure is information more important than the background information, the human figure information preferably has high robustness against transmission path errors. For this reason, many resync markers are arranged on the human figure portion to arrange video packets at short intervals so as to improve the error robustness, thus allowing quick recovery from a transmission path error. In contrast to this, since the degree of important of the background portion is not very high, a smaller number of resync markers may be arranged in the background portion to increase the intervals between the video packets therein.

In an encoding scheme of encoding a frame from the upper left macroblock to the lower right macroblock in the raster scan order, an error introduced into a given macroblock may propagate to the lower right macroblock. When the error propagates to an important region, in particular, the picture quality greatly deteriorates. For this reason, a macroblock from which an important region starts may be set as the first macroblock in an access unit to prevent an error introduced into another macroblock from affecting the important region. In the case shown in FIG. 50, the macroblock at the left end of the human figure as an important region is the first macroblock of an access unit.

Figure 51:
FIG. 51 is a view for explaining an example of how error protection is switched in accordance with the degree of importance of each region in the frame in the fourth embodiment.

If the strength of error protection can be changed in one access unit, the strength may be changed in accordance with the degrees of importance of regions in a frame. Referring to FIG. 51, the light gray (hatching) region indicates an region (High QoS) for which strong error protection is provided, which is assigned to the human figure portion as important information. FIGS. 52A to 52C each show an example of the format of an access unit corresponding to such a picture. Referring to FIGS. 52A to 52C, the light gray (hatching) portions correspond to the light gray macroblocks in FIG. 51, for which strong error protection is provided.

When a video packet is to be encoded upon being divided into "Motion" and "Texture", "Motion" is set in the first half portion of an access unit, and "Texture" is set in the second half portion, as shown in FIGS. 52A to 52C. In addition, the important regions indicated by the light gray in FIG. 51 may be respectively set in the first half portions of the first and second half portions. Alternatively, "Motion" and "Texture" may be set in different access units, and stronger error protection may be provided for the first half portions of the respective access units. With this arrangement, stronger error protection can be provided for the "Motion" portion, of the code stream of the important region, which is more important than the remaining portions.

As described above, according to the present invention, by arranging resync markers and using the format of an access unit, higher error robustness can be realized with a smaller overhead (redundancy). In general, when resync markers are used and strong error protection is provided, the overhead increases. If, however, many resync markers are assigned to a human figure or the like as important information to fortify error protection provided therefor, and fewer resync markers are assigned to a less important region such as a background portion to weaken error protection, higher error robustness can be provided for the important information, as compared with the case in which resync markers are uniformly assigned to the overall picture, and error protection is uniformly provided therefor, with the same average overhead.

When many resync markers are assigned to a portion like the human figure portion in FIG. 51, the length of each video packet decreases very much accordingly. If, therefore, each video packet is assigned to one access unit, the overhead based on an AL header, a multiplexed header, a multiplexed sync code, and the like increases very much. In this case, as shown in FIGS. 45A and 45B, a plurality of video packets are preferably set in one access unit to reduce the overhead.

Figure 53:
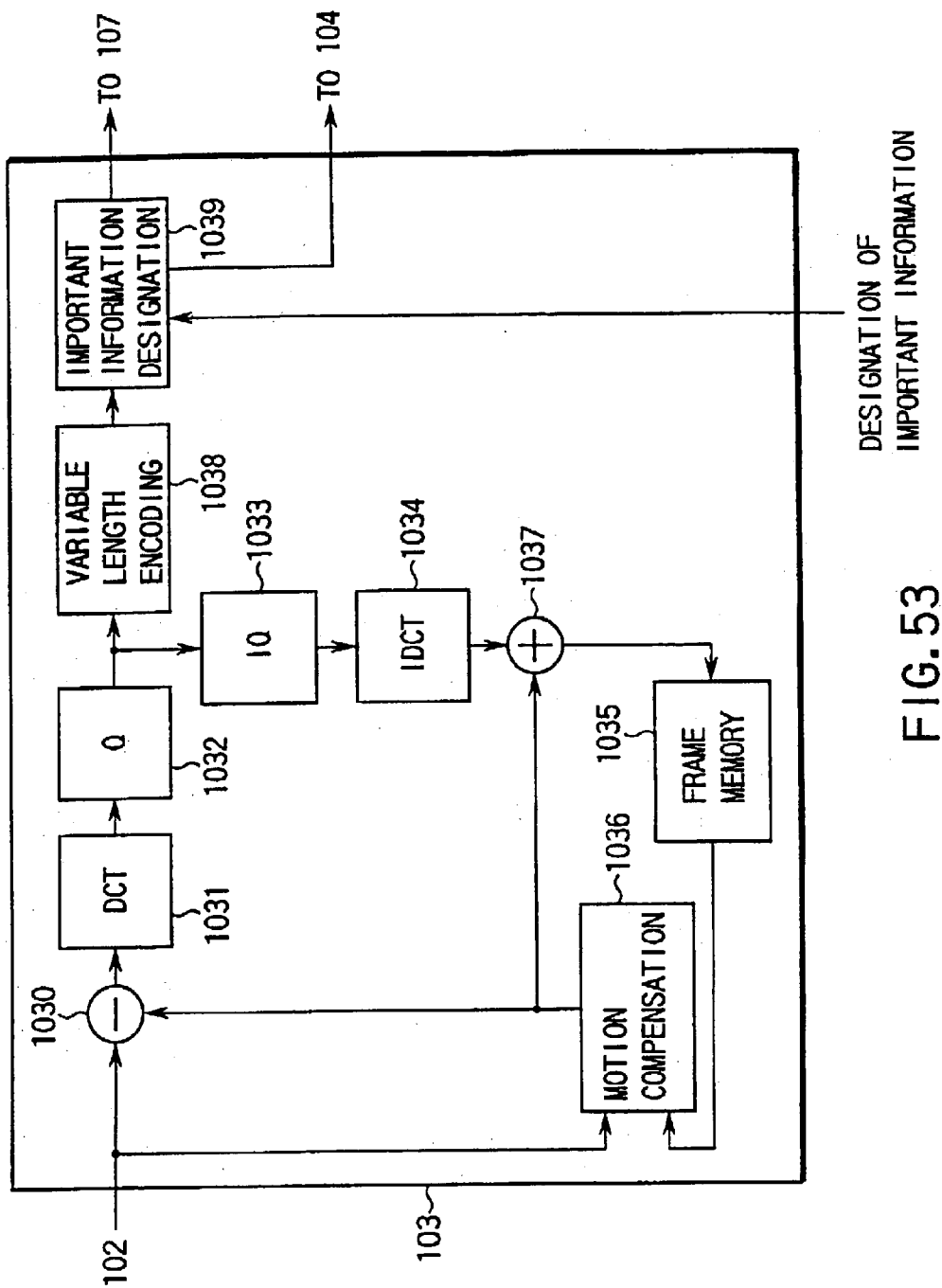
FIG. 53 is a block diagram showing the circuit arrangement of an encoder in the encoding apparatus shown in FIG. 1.

FIG. 53 shows the circuit arrangement of the encoder 103 of the encoding apparatus shown in FIG. 1. According to this arrangement, the picture information input to the encoder 103 is sent to a motion compensation circuit 1036 first. In this case, the motion compensation circuit 1036 performs motion compensation between the input picture information and the previous frame information stored in a frame memory 1035. A subtracter 1030 calculates the difference between the previous frame information and the current frame information after the motion compensation. Only the difference information is DCT-transformed in a discrete cosine transform circuit (DCT) 1031, and is quantized by a quantizer 1032. The resultant information is sent to a variable-length encoder 1038.

The output from the quantizer 1032 is dequantized by a dequantizer (IQ) 1033. The resultant data is IDCT-transformed in an inverse discrete cosine transform circuit (IDCT) 1034. The output from the inverse discrete cosine transform circuit 1034 and the motion compensation information from the motion compensation circuit 1036 are added together by an adder 1037. The output from the adder 1037 becomes decoded picture information of the current frame, i.e., local decoded picture information. This local decoded image information is stored in the frame memory 1035 to be used as data for motion compensation in encoding the next frame.

The quantized information sent to the variable-length encoder 1038 is subjected to variable-length encoding. The resultant information is sent to an important information designation circuit 1039. This important information designation circuit 1039 extracts only the externally designated important information portion from the variable-length encoded information, and sends it to the important header information reconstruction circuit 104. Note that all the information is sent to the bit string reconstruction circuit 107 regardless of whether the important information designation circuit 1039 designates important information.

Figure 54:
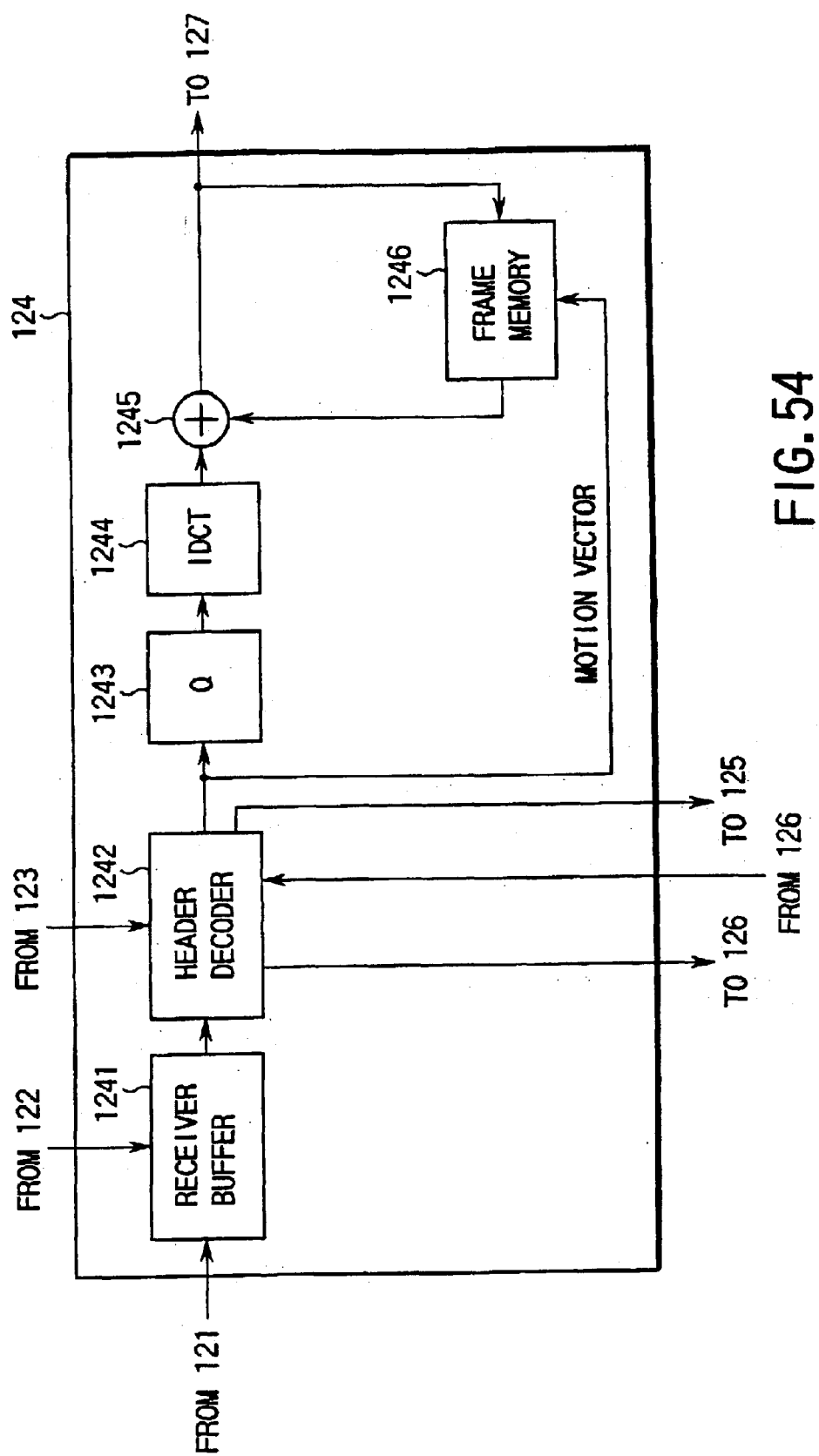
FIG. 54 is a block diagram showing the circuit arrangement of a decoder in the decoding apparatus shown in FIG. 2.

FIG. 54 shows the circuit arrangement of the decoder 124 of the decoding apparatus shown in FIG. 2. According to this arrangement, the picture information sent from a demultiplexer 121 is temporarily stored in a reception buffer 1241. Thereafter, the subsequent header information is sent to a header decoder 1242 in response to decoding start position information from a synchronization detector 122. The header information is decoded by the decoder 1242. At this time, the header information on the uppermost layer is decoded first, and the decoded information is sent to an error check circuit 125, which checks the presence/absence of an error in the information. The pieces of header information on the subsequent layers are decoded in accordance with a designation from a designation information determination circuit 123. That is, when the presence of important header information is designated, the information at a predetermined position is decoded as the important header information. This important information is transferred to the important information circuit 126 to be temporarily stored therein. When an important information circuit 126 detects the introduction of an error in the header information on the uppermost layer, since the important header information from the important information circuit 126 is sent back to the decoder 1242, the decoder 1242 continues the subsequent decoding processing by using the important header information from the important information circuit 126.

The information (actual picture information) following the header information is dequantized by a dequantizer 1243. The resultant information is sent to an IDCT circuit 1244. The IDCT circuit 1244 calculates the inverse discrete cosine transform of the dequantized information, and decodes the difference signal between the current and previous frames. An adder 1245 adds this decoded difference signal to the previous frame information (the previous frame information after motion compensation using motion vector information) stored in a frame memory 1246. This addition result signal becomes reconstructed picture information of the current frame. This information is sent to a D/A circuit 127 and is also stored in the frame memory 1246.

The arrangements of the encoding/decoding apparatuses and the stream structures of the embodiments described above can be combined with each other, as needed. In addition, the operations of the respective encoding/decoding apparatuses can be replaced with procedures based on software control. The corresponding software programs and encoded streams can be provided as a storage medium.

As has been described above, according to the present invention, since error robustness is provided for the structure of a code stream itself, even if an error is introduced into important information such as header information, and the information cannot be used for decoding processing, the decoding processing can be properly continued by using new information designated by designation information as a substitute. In addition, since strong error protection is provided for important information such as a picture header and a slice header in a video code stream by using error correction and detection codes, a high-quality video signal can be decoded even in the event of a transmission path error as compared with the conventional video encoding apparatus and the conventional multiplexing apparatus which do not provide sufficient error protection for important information. Furthermore, since a multiplexed unit code stream having a length corresponding to an integer multiple of a predetermined length is generated by adding stuffing bits, the introduction of an error can be easily detected. Moreover, since an access unit is formed by collecting code words having the same degree of importance, error protection can be performed in accordance with the degrees of importance of the code words. As a result, the quality of the decoded picture improves in the event of a transmission path error.

What is claimed is:

1. A video data signal for use in transmitting image information, comprising:

an encoded video stream including:

encoded information containing a picture code stream obtained by compress-encoding a picture signal;

frame header information; and slice header information including reconstruction information required for reconstructing contents of the frame header information or part of the frame header information and added to the encoded information, the reconstruction information containing information indicating a display timing of each picture frame of the picture code stream.

2. A video data signal according to claim 1, which includes instruction information indicating addition of the reconstruction information to the header information.

3. A video data signal according to claim 1, wherein the slice header information includes prediction type information indicating a predictive encoding type and designation information prepared in the prediction type information.

4. A video data signal according to claim 1, wherein the slice header information includes identification information.

5. A video data signal according to claim 4, wherein the identification information is configured by one bit that can be two types of identification.

6. A video data signal according to claim 4, wherein the identification information is configured by two bits that can be four types of identification.

7. A video data signal according to claim 4, wherein the reconstruction information is inserted after the identification information.

8. A video data signal according to claim 1, wherein the reconstruction information includes time reference information indicating the display timing and prediction type information indicating a predictive encoding type.

9. A video data signal according to claim 1, wherein the frame header information includes a sync code indicating a start position of a picture, time reference information indicating a timing at which a frame is reproduced, prediction type information indicating a predictive encoding type, and quantization step size information indicating a quantization step size.

10. A video signal according to claim 1, wherein the slice header information includes a sync signal indicating a start of a slice header information includes a sync signal indicating a start of a slice picture code, prediction type information indicating a predictive encoding type, slice number information, and quantization step size information.

* * * * *

UNITED STATES PATENT AND TRADEMARK OFFICE
CERTIFICATE OF CORRECTION

PATENT NO.      : 6,961,354 B2
DATED           : November 1, 2005
INVENTOR(S)     : Watanabe et al.

It is certified that error appears in the above-identified patent and that said Letters Patent is hereby corrected as shown below:

Title page,
Item [30], Foreign Application Priority Data, should read:
-- Sep. 2, 1996 (JP) ....................................8-232081
   Mar. 14, 1997 (JP) ..................................9-061306
   Jun. 25, 1997 (JP) ...................................9-168929
   Jul. 14, 1997 (JP) .................................. ...9-188750 --.

Signed and Sealed this

Tenth Day of January, 2006

JON W. DUDAS
*Director of the United States Patent and Trademark Office*